United States Patent [19]
Sawai et al.

[11] Patent Number: 5,831,956
[45] Date of Patent: Nov. 3, 1998

[54] DISC LOADING DEVICE

[75] Inventors: Kunio Sawai; Katuyuki Yokota; Hideki Kume; Shigeru Takemura, all of Osaka; Masaaki Takagi; Nobuyuki Kimura, both of Tokyo, all of Japan

[73] Assignee: Funai Electric Co., Ltd., Daito, Japan

[21] Appl. No.: 742,860

[22] Filed: Nov. 1, 1996

Related U.S. Application Data

[63] Continuation of Ser. No. 287,952, Aug. 9, 1994, abandoned.

[30] Foreign Application Priority Data

| Aug. 9, 1993 | [JP] | Japan | 5-216986 |
| Aug. 10, 1993 | [JP] | Japan | 5-218093 |
| Aug. 11, 1993 | [JP] | Japan | 5-219113 |
| Aug. 11, 1993 | [JP] | Japan | 5-219116 |
| Oct. 6, 1993 | [JP] | Japan | 5-274846 |
| Oct. 6, 1993 | [JP] | Japan | 5-274847 |
| Nov. 30, 1993 | [JP] | Japan | 5-325854 |
| Dec. 3, 1993 | [JP] | Japan | 5-339297 |
| Dec. 3, 1993 | [JP] | Japan | 5-339298 |
| Jun. 8, 1994 | [JP] | Japan | 6-148753 |

[51] Int. Cl.$^6$ ................................. G11B 33/02
[52] U.S. Cl. ........................................ 369/75.2

[56] References Cited

U.S. PATENT DOCUMENTS

| 4,926,406 | 5/1990 | Ikedo et al. | 369/36 |
| 5,038,331 | 8/1991 | Ogawa | 369/77.1 |
| 5,084,854 | 1/1992 | Ikedo et al. | 369/75.1 |
| 5,107,474 | 4/1992 | Ishibashi et al. | 369/34 |
| 5,280,463 | 1/1994 | Okajima et al. | 369/36 |
| 5,434,839 | 7/1995 | Choi | 369/77.1 |

Primary Examiner—Allen T. Cao
Attorney, Agent, or Firm—Jackenbach Siegel Marzullo Aronson & Greenspan, P.C.

[57] ABSTRACT

A disc device which performs to ascend and descend an ascending and descending chassis mechanically by a slide plate provided at a tray at the time of insertion or discharge of the tray, and maintains the ascending and descending chassis at the ascending position or lowers it by latching or separating the above slide plate with a lock member. In order to attain the above object, a guided portion 9 is provided to the ascent and descent chassis and a guide member 82 which ascends and descends the above guided portion 9 by front and rear moving operation is positioned at both sides of the above ascending and descending chassis 2 so as to be able to move in front and rear direction. In addition, a slide plate 102 which urges the guide member 82 to a tray 100, and a lock means which latches the above slide plate 102 so as to be able to latch or separate, are provided.

14 Claims, 40 Drawing Sheets

F I G. 7 (a)
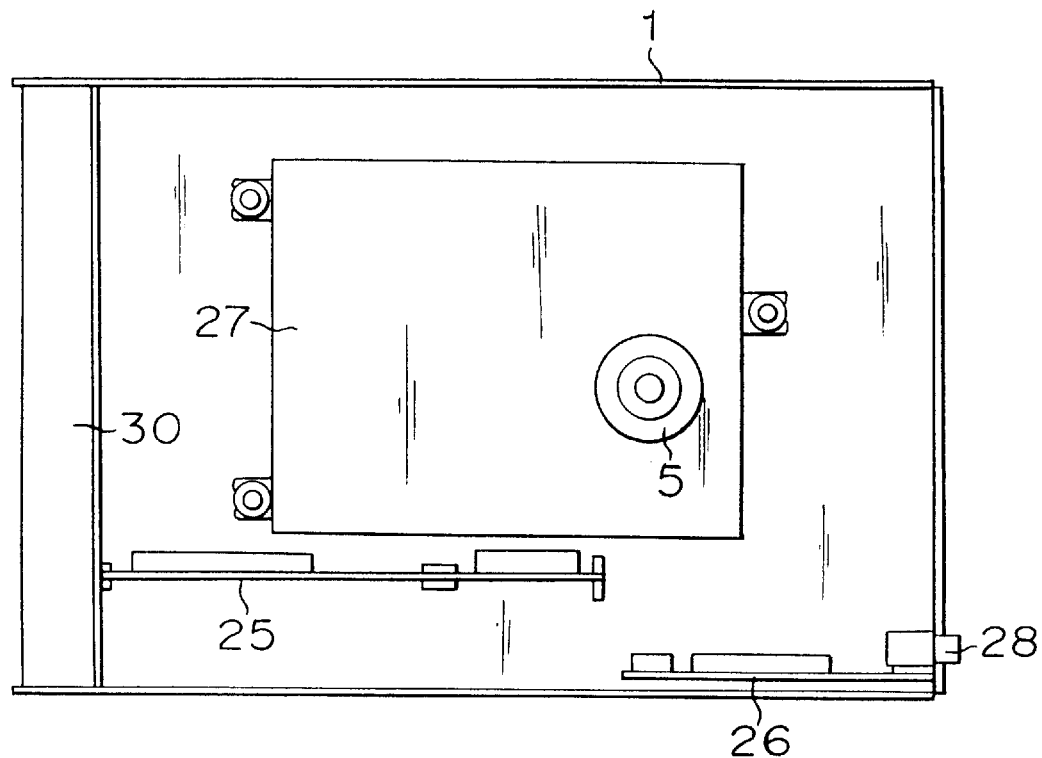
F I G. 7 (b)
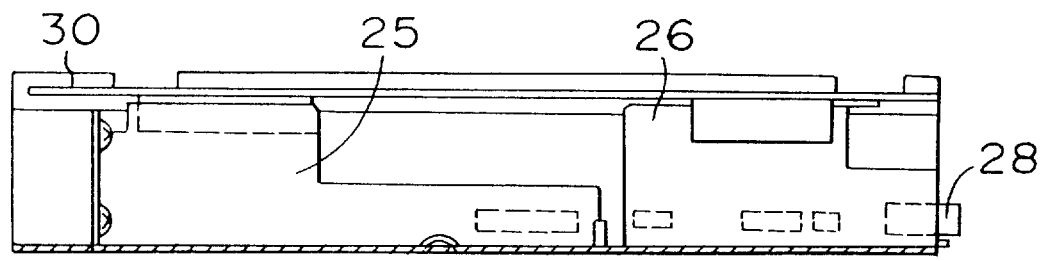

F I G. 15
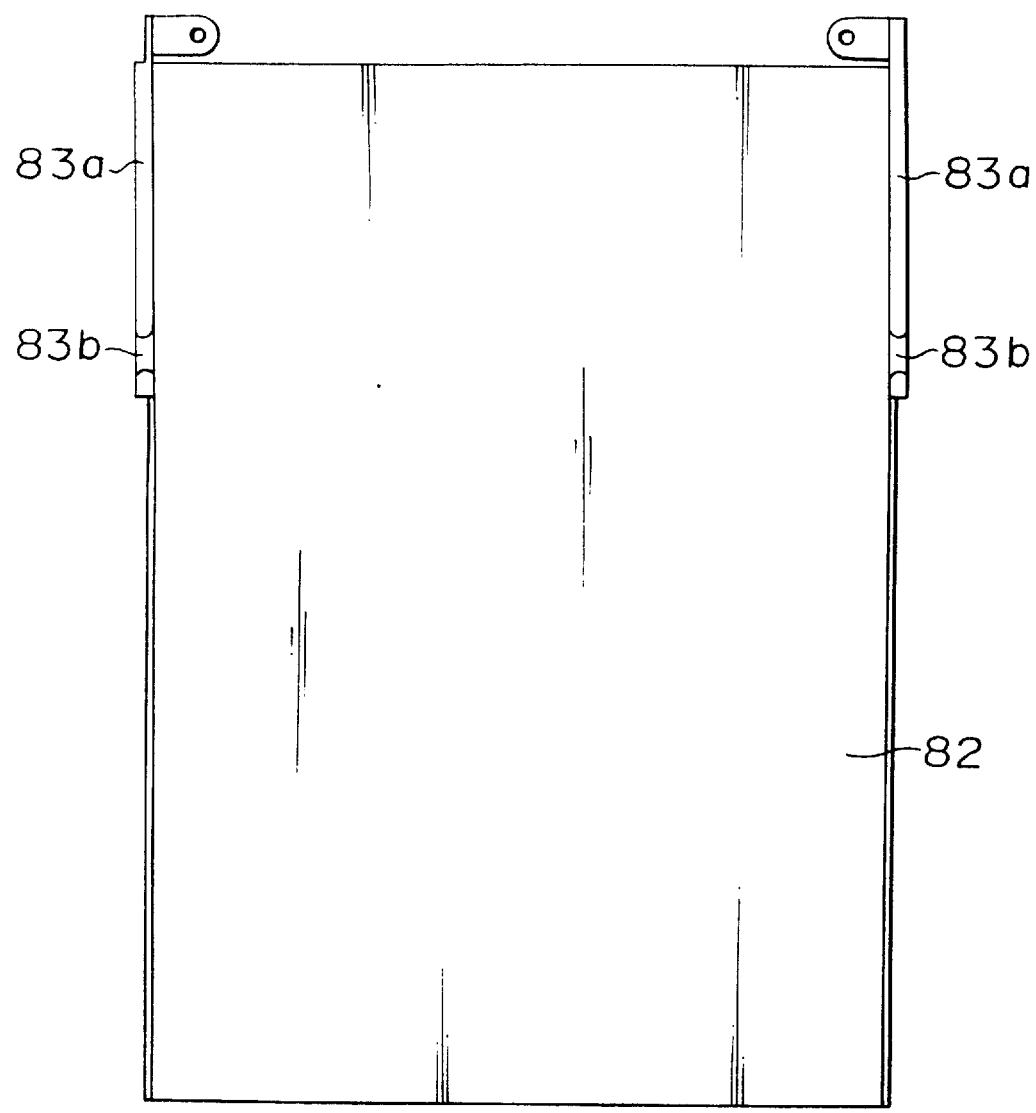

F I G. 22(a)  F I G. 22(b)
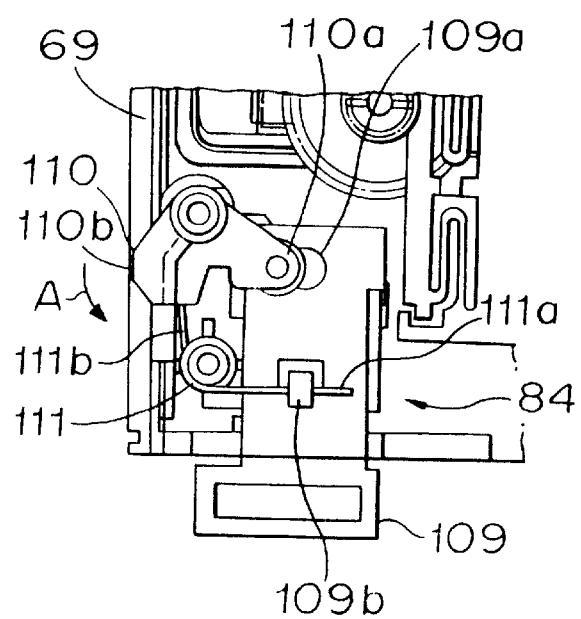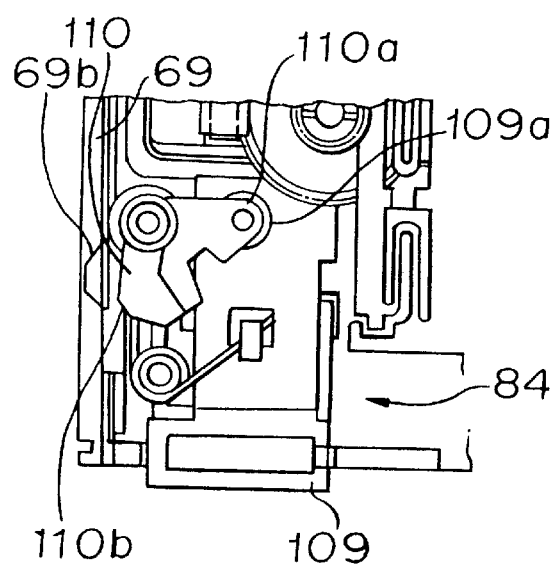

F I G. 27 (a)
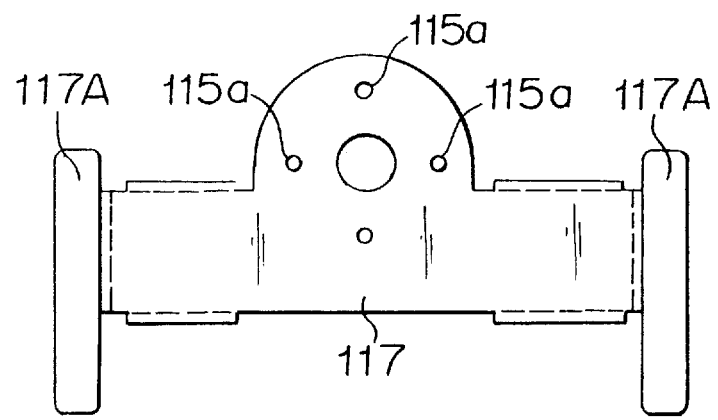
F I G. 27 (b)
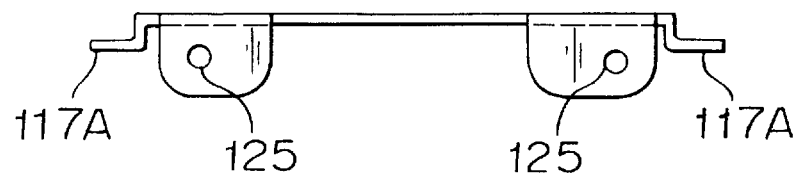
F I G. 28
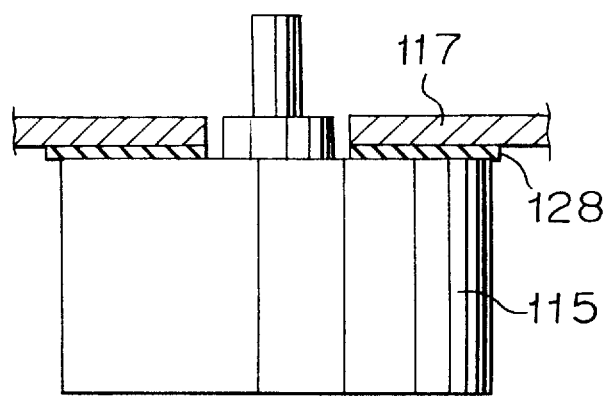

F I G. 29 (a)
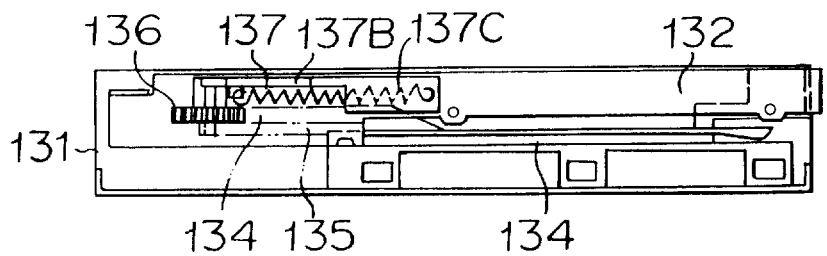
F I G. 29 (b)
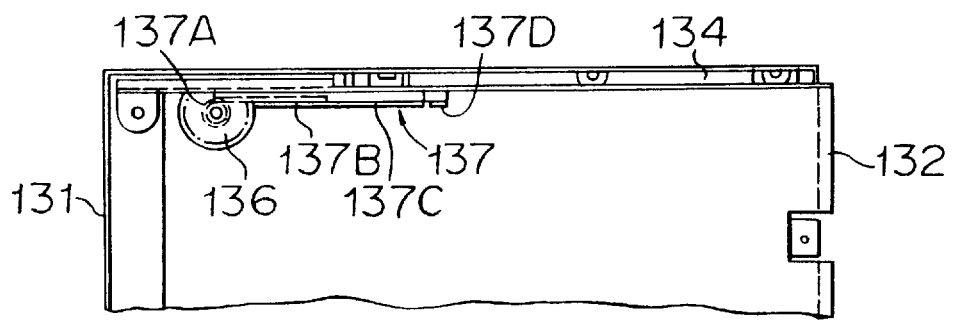
F I G. 29 (c)
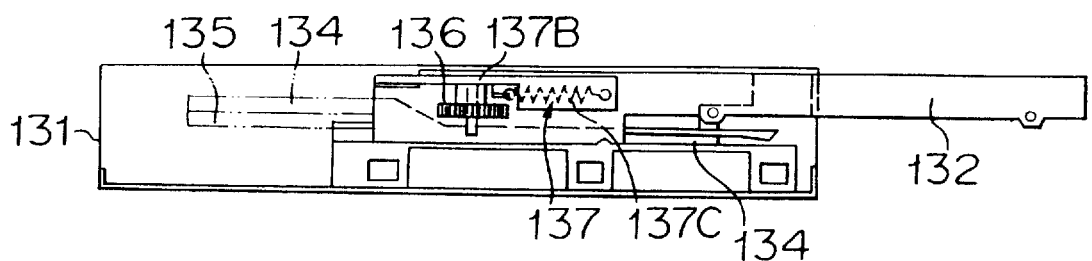
F I G. 29 (d)
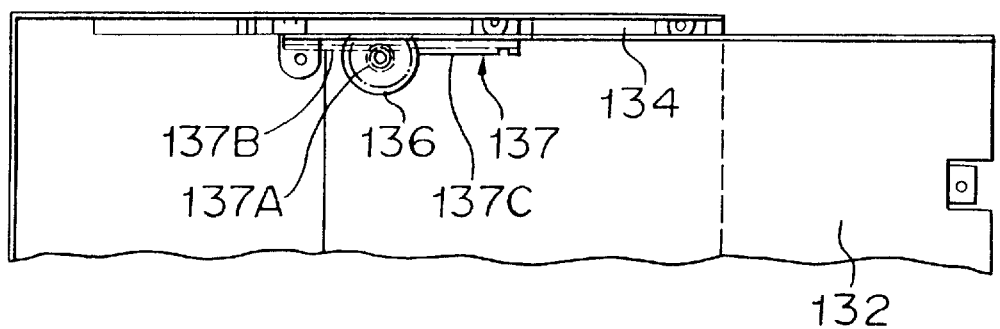

F I G. 31(a)
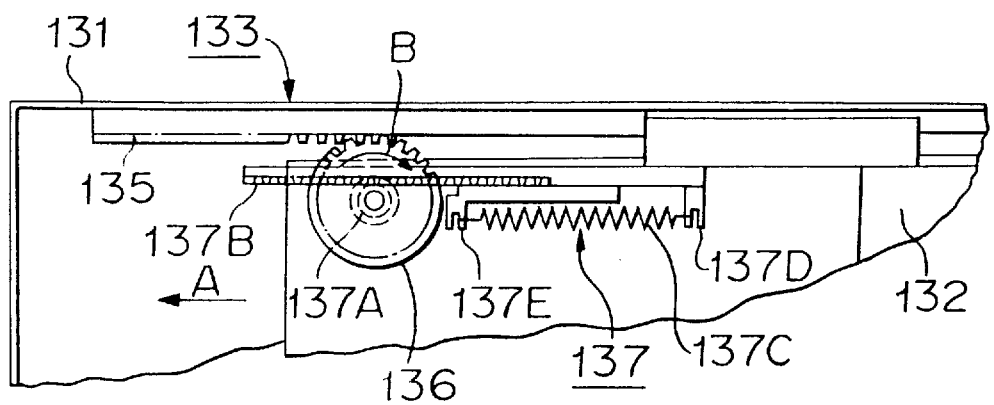
F I G. 31(b)
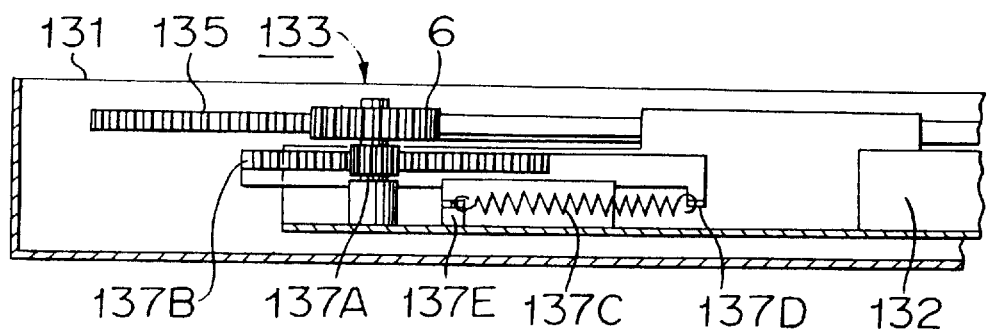

F I G. 35 (a)
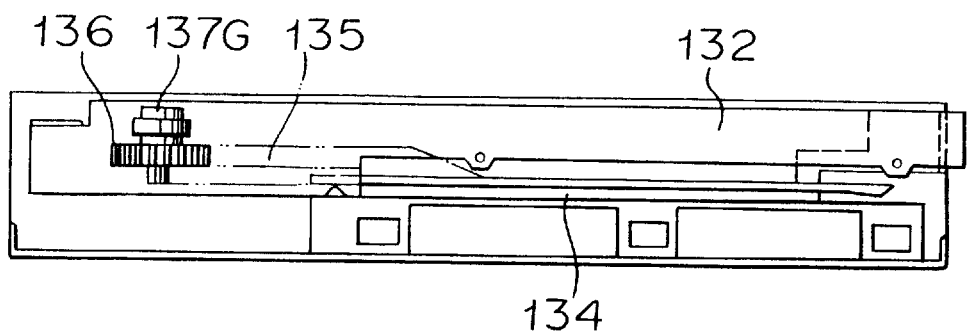
F I G. 35 (b)
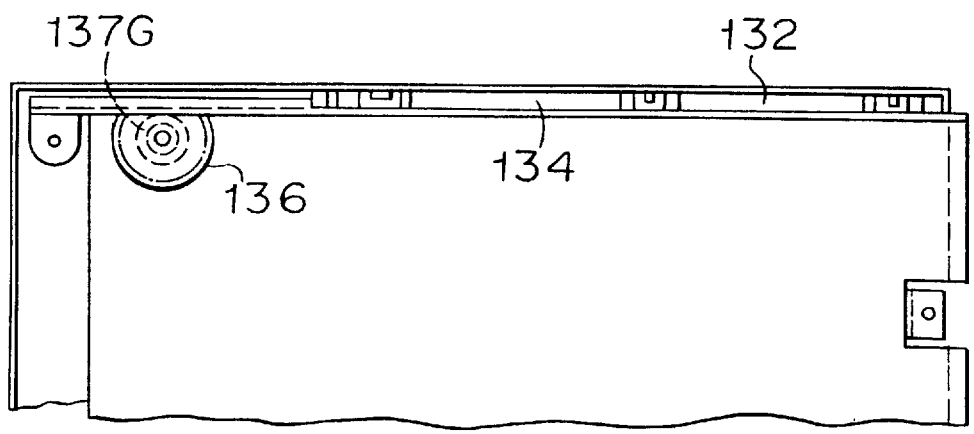

F I G. 38
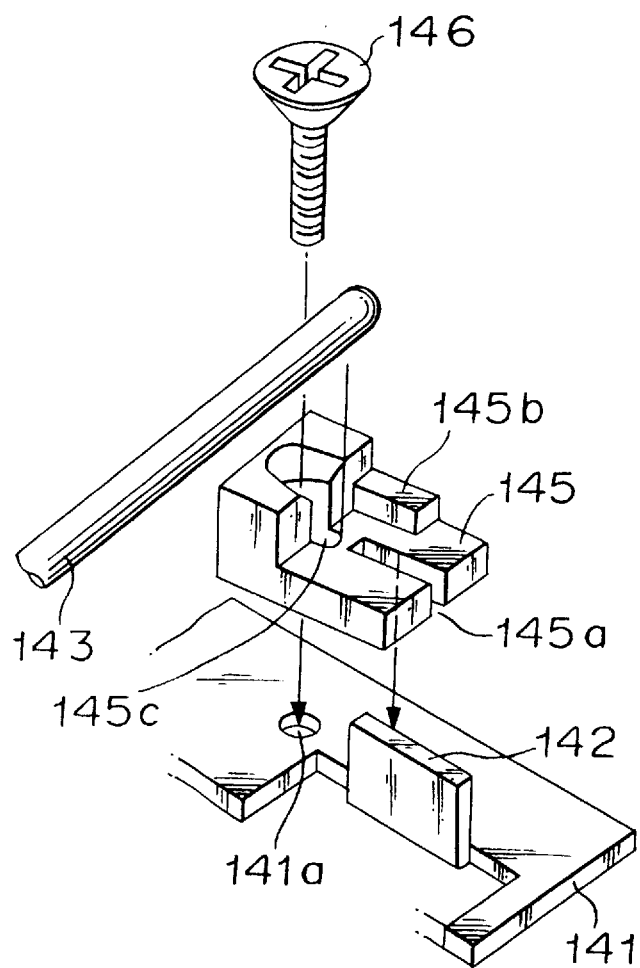

F I G. 41 (a)
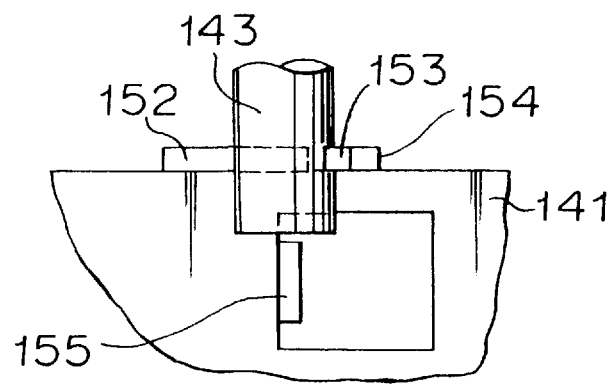
F I G. 41 (b)
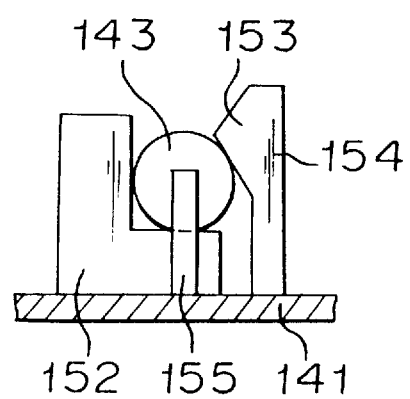

F I G. 42 (a)
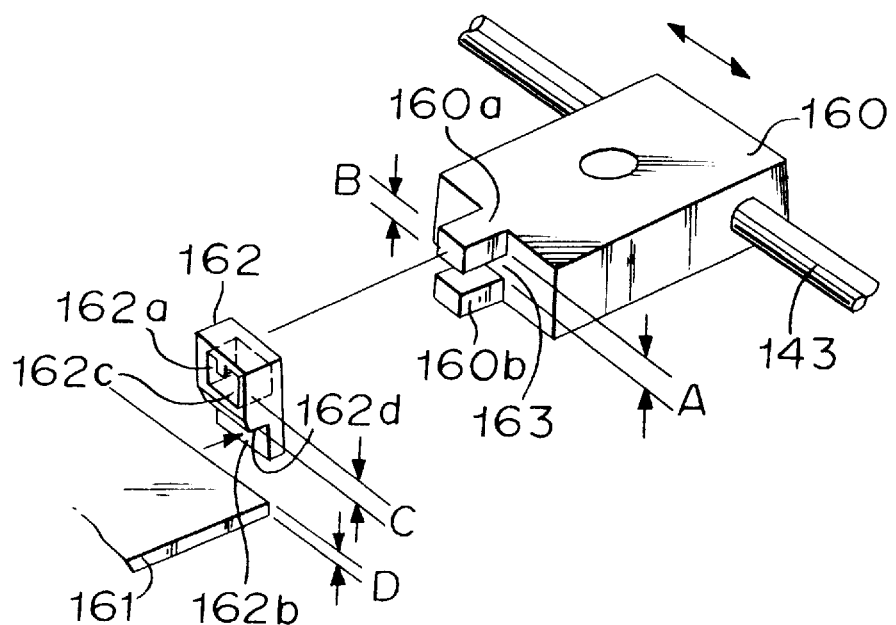
F I G. 42 (b)
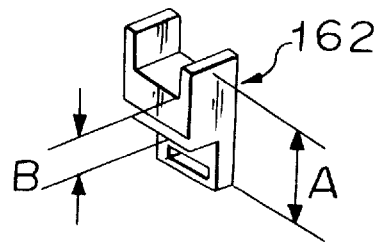

DISC LOADING DEVICE

This application is a continuation of application Ser. No. 08/287,952, filed Aug. 9, 1994, now abandoned.

BACKGROUND OF THE INVENTION

This invention relates to a disc loading device wherein a disc such as an optical disc, and magneto-optical disc or the like is provided on a tray, which slides into a box body, thereby automatically loading a disc onto a turntable.

Known disc devices are provided with an optical pickup on a chassis, and said disc on a tray is loaded onto a turntable by driving the motor, when said tray on which a disc is mounted is inserted into the device box body.

The known disc devices, however, have a lot of disadvantages, for example, the structures of the devices are very complicated, use many parts, and necessitate complicated and troublesome steps for assembling, because complicated mechanisms are necessary to drive and control the tray for loading discs onto the turntable, and other complicated mechanisms are also necessary to load and unload discs onto and off the turntable.

In addition, chucking means used for holding the disc to the turntable must be arranged at the upper portion of the turntable, which necessitates a rather wide occupational space. Accordingly, the whole device becomes high which is contrary to consumer desire to make the device thinner and smaller.

In generally known disc devices, a tray having a turntable assembly is installed on a slide chassis, and said slide chassis is arranged so as to slide into the box body.

However, such former box bodies of disc devices are complicated in slide mechanism and the attached construction of ceiling plate, which lacks a smooth movement of the slide body and increases the number of parts.

Further, a tray lock means in the known disc device is unlocked by pushing an eject button for a certain distance to thereby release the lock of the eject button to move the tray out of the box body.

However, the eject button pushed is in for a certain distance to unlock in the known disc device. Accordingly, the space for forwarding the button restricts space for the tray and face plate in the box body.

The eject mechanism which removes a slide chassis (supporting chassis to slide the tray) from the box body, is activated by a stored energy of a spring which is abutted to the slide chassis, however, the return distance of the chassis taken out of the box body is rather small, and accordingly, the chassis has to be manually puled out for a complete ejection.

Although eject mechanisms which may completely and automatically take out the slide chassis are proposed, none of them are yet satisfactory.

SUMMARY OF THE INVENTION

A first object of this invention is to provide an automatic disc loading device in which the entire structure is simple and many parts can be eliminated, wherein a simple rack and pinion mechanism for loading and unloading a disc on a turntable and for driving a tray on which a disc is mounted is used.

Further, this invention relates to an automatic disc loading device in which the height of the whole device is greatly decreased, wherein idle space below the turntable is used to house a chucking means.

The second object of this invention is to provide a cheaper disc device having a fewer number of parts by mechanically raising and lowering the chassis by a slide plate provided at the tray at the time of the charge or discharge of the tray, and by holding said chassis at ascending position or allowing it to descend by latching or unlatching said slide plate by lock means.

The third object of this invention is to provide a box body construction for a disc device which enables a smooth sliding of chassis and is easy to install the ceiling board and printed circuit, by using a plastic guide member and slide chassis.

This invention further provides a tray lock construction of the disc device, in which a stroke distance for unlocking eject is decreased, and a space for the printed circuit is increased.

The fourth object of this invention is to provide a new disc device of which the chucking mechanism is very simple and of which the height of the box body is greatly decreased.

The fifth object of this invention is to provide a disc device eject mechanism, in which a full return of the slide chassis is secured, when the slide chassis is drawn out of the box body by a handle.

Accordingly, the present invention provides a disc loading device in a box body, which is provided with a chassis along which an optical pick-up slides and on which is mounted a disc driving motor, and a tray which sends a disc to a turntable driven by motor, wherein said tray is provided with a disc holding means, an ascent and descent means for loading said disc on a turntable, a slide plate which moves back and forth for loading a disc and a lock means which locks the slide plate when transferring to the loading position, and unlocks the slide plate at the loading position, and said box body being provided with a motor which drives said tray; an axis of said motor being connected to gear in a row; a first rack which engages with a first gear being provided on the tray, a second rack which engages with a second gear being provided on the slide plate, and each rack being connected to said gears so that when said tray comes to said loading position and the first rack is disengaged from the first gear, said second rack with said second gear starts.

Accordingly, the tray and slide plate can be easily operated by adopting a rack and pinion mechanism, whereby the construction of the entire device is simplified and the number of parts can be decreased.

In the above disc loading device in a box body of the present invention, a chucking means for holding a disc on the turntable is provided with a chucking member installed under the turntable, a plurality of guide holes formed at said turntable, and chucking hooks which freely latch or unlatch said disc by protruding on the turntable through said guide holes.

The above chucking means is provided with an elastic support mechanism which supports said chucking member elastically so as to separate from said turntable, and with an ascent and descent means which raises or lowers said chucking member by interlocking with a tray for disc loading at the time of loading a disc.

In the disc loading of the present invention, said tray is further provided with a pair of disc holding members at left and right sides of the disc, said disc holding members properly positioning any discs which have different diameters, and said disc holding members being controlled to descend when the tray is loaded at the loading position.

The above disc holding member is constituted to be supported rotatably by an axis positioned at both sides of said tray extended to front and rear, operated by handling means provided at the tray, and rotated with a center of the axis at said loading position thereby being provided to the table by descending the disc.

The above handling operation means is provided with a cam guide which guides a cam follower provided at said disc maintenance member and is adapted to descend said disc holding member by guiding said cam follower with said cam guide.

Further, said tray is provided with a slide plate having said cam guide and a means which locks said slide plate during charging to the place of the loading position of the disc and releases said lock at the loading position.

The box body holds said tray at the disc loading position and is provided with a latching means which holds said lock means at a lock position thereof.

In the box body, first and second printed circuits connected to a main printed circuit are installed vertically at a side of a supporting chassis of the optical pickup, and an output jack such as a head phone or the like is installed at a front portion of said second printed circuit.

Accordingly, a space for chucking means is not necessary above the turntable in the present invention, whereby the entire box body becomes thinner than in the normal one, its structure is simplified, and the number of parts can also be decreased.

Further, this invention is characterized by the fact that in the disc device which comprises a chassis provided with a motor for said disc together with providing an optical pickup movable in a radial direction and a tray for loading the disc on the turntable of said motor, pole-like guided portions are provided at both sides of said chassis, a guide member having a groove for guiding said guided portion which moves freely forward and backward is provided at both sides of said chassis and a driving means of said guide member which moves said guide member to the front and rear is provided at both sides of said chassis, and when the guide member is pushed to the rear by said driving means, the guided portion is guided along the groove whereby the chassis is adapted to ascend.

One side of the chassis is rotatably supported and the guide member is adapted to guide the guided portion provided at another portion of the chassis.

The guide portions are provided at both sides of the chassis, and said member is characterized by guiding the guided portion provided at both sides of said chassis at the same time.

A slidable slide plate is provided at the tray and said driving means are constituted by an urged portion provided at both sides of said slide plate and a handling operative portion provided at the front of said slide plate.

Between the tray and the slide plate, a spring which energizes said slide plate forwardly is provided with said slide plate and a front edge of the tray, and a nearly L-shaped slit where the slide slides beneath the tray is provided.

At the opposite side of the guide pin of the lock lever, an operational lever portion for releasing the lock of the slide plate is provided, said operational lever portion abutting against an urging element provided to the box body thereby enabling the slide plate to slide.

Further, the tray is adapted to be locked at a certain position by latching a latching pin provided at the slide plate to the lock lever of the box body.

Furthermore, the chassis is guided by the guide member of the body or the like provided at the box body so as to move up and down.

Still further, a projection forward at the rear of the tray abuts against an end portion of a beam member attached to the chucking means, said projection being used as a tray stopper.

Accordingly, when the slide plate is activated with the guide member, while a tray is mounted, the chassis mechanically moves up and down along the guided portion. There is thus no need of a motor or other transmission means for the movement of the chassis. Construction of the device becomes simple and the lock means may also be a simple one.

This invention comprises a chassis provided slidably in the box body, a guide portion formed at the side of said chassis, a tray for disc conveyance combined with said chassis, a guide member provided at the box body side which leads the guide portion of said chassis and a roller combined to said guide member, said roller being adapted to be contacted by lower edge portion of said tray.

Further, a projective portion is formed at the guide portion of the chassis, said projective portion being adapted to the groove of the guide member.

Furthermore, a projective portion is formed at the end of the groove of the guide member.

Still further, together with a bending portion having an L shape formed at the inner side of the body box at the near end of a guide member, a torsion spring is attached to the tray to abut against said bending portion thereby making the tray eject easily.

In addition, together with forming a tongue piece at the front side of the ceiling, a latching portion which latches said tongue piece to the guide member is formed.

A projection is formed at the ceiling side of the guide member whereby the ceiling plate abuts against this projection.

Together with providing a rib on the tray, the stopper is provided at the ceiling whereby the rib of said tray is adapted to abut against said ceiling stopper.

A cutaway portion is provided at the rear side of the box body, while a slit is formed at the rear end of the guide member whereby a first printed wiring plate is supported by said cutaway portion and slit.

A second printed wiring plate is attached to the chassis, and the first and the second wiring plates are connected to each other by a flexible wire.

In this invention, the slide chassis slides along the guide groove of the guide member whereby the tray is drawn out and stored. In this case, the lower end edge of the tray contacts the guide roller attached to the roller axis of the guide member to function whereby the slide chassis performs a smooth action. The ceiling is received by a receiving portion of the guide member and can be attached without providing another receiving part.

In this invention, a driving device which comprises a pinion and a rack geared therewith is constituted so that said rack and pinion may be urged.

According to this invention, since the rack and the pinion are constituted so as to be always urged, the rack and the pinion always maintain a suitable intermeshing thereby being able to remove a backlash which breaks out at the intermeshing portion of the rack and pinion.

Further, the lock construction of the tray of the disc device in this invention is constructed by the eject button provided slidably at the tray for disc conveyance, a rotatable lock lever provided at said tray, a latching hole which locks said tray at a certain place by latching one end of said lock lever and a torsion spring provided between said lock lever and said eject button.

If the tray is stored in the box body, when the tray is pushed in, the other end of the lock lever is latched with a latching hole provided in a slide member made of torsion spring, thereby locking the tray.

In order to unlock, when the eject button is pushed, the lock lever rotates thereby unlocking the lock lever.

This invention is further constructed by a fixed chassis on which an optical pickup moves in a radial direction of the disc, a tray for charging a disc provided in front and back movably against said fixed chassis together with placing a motor for disc or the turntable, a supporting stand which supports said disc or turntable provided at said tray, a movable slide plate provided at said tray in the front and rear direction and a maintenance member which releases the maintenance of said supporting stand by the action of the tray charging of said slide plate together with maintaining said supporting stand.

Said supporting stand is provided with inserting portions at the left and right sides and said maintenance member is constructed by a pair of members movable to the left and right sides against the tray of said maintenance member and further said supporting stand is held with an inserted portion when inserted into said inserting portion.

Further, the front end portion of the guide rail which guides the optical pickup in the radial direction of the disc is extended corresponding to said supporting stand and an insetting hole which determines a position which receives an extended portion of said guide rail to said supporting stand is provided.

According to this invention, the disc motor is fixed to the tray and moves with the tray when the tray is not inserted into the box body. On the other hand, when the tray is charged at the certain place, the supporting stand where the motor is fixed, is positioned at the certain position by the guide shaft which guides the optical pickup.

The turntable combined integrally with motor through the axis is constructed to chuck the disc by the ball attached to the turntable. Accordingly, there exists no other chucking on the turntable thereby being able to make the height of the box body smaller.

The eject mechanism of the disc device in this invention for drawing out of the slide chassis included into the device box body is provided with a first rack set in the device box body along the guide rail which guides the slide chassis, a first gear rotatably supported by the slide chassis at the intermeshing portion with rack, and a spring mechanism which stores the return force by the intermesh of the first gear against the first rack at the time of inducing the slide chassis corresponding to the device box body.

The above spring mechanism is provided on the chassis with the second gear which is linked with the first gear, the second rack which engages with the second gear and which slides in the moving direction of the slide chassis, and a spring member bridged between this rack and the slide chassis, and said second gear is a different type gear which gradually decreases a radial in the periphery direction as the engagement radial with second rack in an inducing direction of the slide chassis decreases.

The spring mechanism is constructed by a centrifugal spring member drawn in by the rotation of the first gear at the time of inducing the slide chassis.

Accordingly, at the time of ejecting, the stored spring force operates on the slide chassis until the first gear releases the engagement with the first rack thereby securing a sufficient return volume when the slide chassis is drawn out of the device box body.

This invention relates to a disc device consisting of the guide shaft of the pickup and a receiving stand which fixes the guide shaft on the chassis, and a cut-raising is formed at said chassis and a slit is provided at said receiving stand together with forming the cut-raising in said chassis and performing a positioning of said guide shaft together with the positioning of said receiving stand.

To said cut-raising is attached a motor for pickup driving.

Said guide shaft of the pickup is fixed by providing a cut-raising for fixing the guide shaft, forming a slit for caulking, together with forming a receiving stand and said slit.

The disc device wherein both sides of the pickup are supported by the guides and movable on said guides constructs one guide thereof by a round bar guide shaft and another by a cutting up of the chassis and is provided with a resin member having an elasticity between the supporting portion formed at said pickup and said cutting of portion.

Since the vertically extending cut-up formed at the chassis is constructed so as to be inserted into the slit of the receiving stand of the guide shaft, said receiving stand is positioned by the cut-raising with accuracy. By this, the positioning of the guide shaft is also secured, the time for positioning is shortened thereby enabling a decrease in preparation costs. Further, since the cut-raising is a construction for attaching a driving motor of the pickup, this is available to the positioning of the cutting up and motor attachment whereby a decrease in costs can be attained with ease.

Since the end portion of the guide shaft is constructed to fix the cutting up provided at chassis by caulking, there is no need of an expensive receiving stand, thereby decreasing the manufacturing costs.

Since the pickup of this invention is constructed movably by using the cut-raising formed at the chassis as a guide through a sliding member made of resin, there is no need of a guide axis having a high cost thereby enabling a decrease in preparation costs.

BRIEF DESCRIPTION OF THE DRAWINGS

FIG. 7 is a view which shows an inner side of the box body of the disc device of the above embodiment, and (a) is a plan view of a printed circuit, and (b) is a side view thereof.

FIG. 15 is a plan view of a slide chassis of the third embodiment.

FIGS. 22(*a*) and 22(*b*) are enlarged views of the material portion of FIG. 19 of this invention, with (*a*) showing a lock state, and (*b*) showing a lock release.

FIG. 27 is views which show a supporting stand in the fourth embodiment, (a) being a plan view and (b) being a side view thereof.

FIG. 28 is a side view which describes the motor attachment to the supporting stand in the fourth embodiment.

FIG. 29 is views showing a fifth embodiment of this invention, (a) being a side sectional view when slide chassis is introduced, (b) being a plan view, (c) being a side sectional view when the slide chassis is drawn out and (d) being a plan view thereof.

FIG. 31 is detailed descriptive views which show when the slide chassis of FIG. 30 is drawn out, (a) is a plan view and (b) is a longitudinal sectional view.

FIG. 35 is another modification view of the fifth embodiment of this invention, and (a) is side sectional view and (b) is a plan view thereof.

FIG. 38 is an enlarged view of a material portion of a sixth embodiment of this invention.

FIG. 41 is another embodiment of the sixth embodiment of this invention.

FIG. 42 is a further modification of the sixth embodiment of this invention.

DETAILED DESCRIPTION OF THE INVENTION

Figure 1:
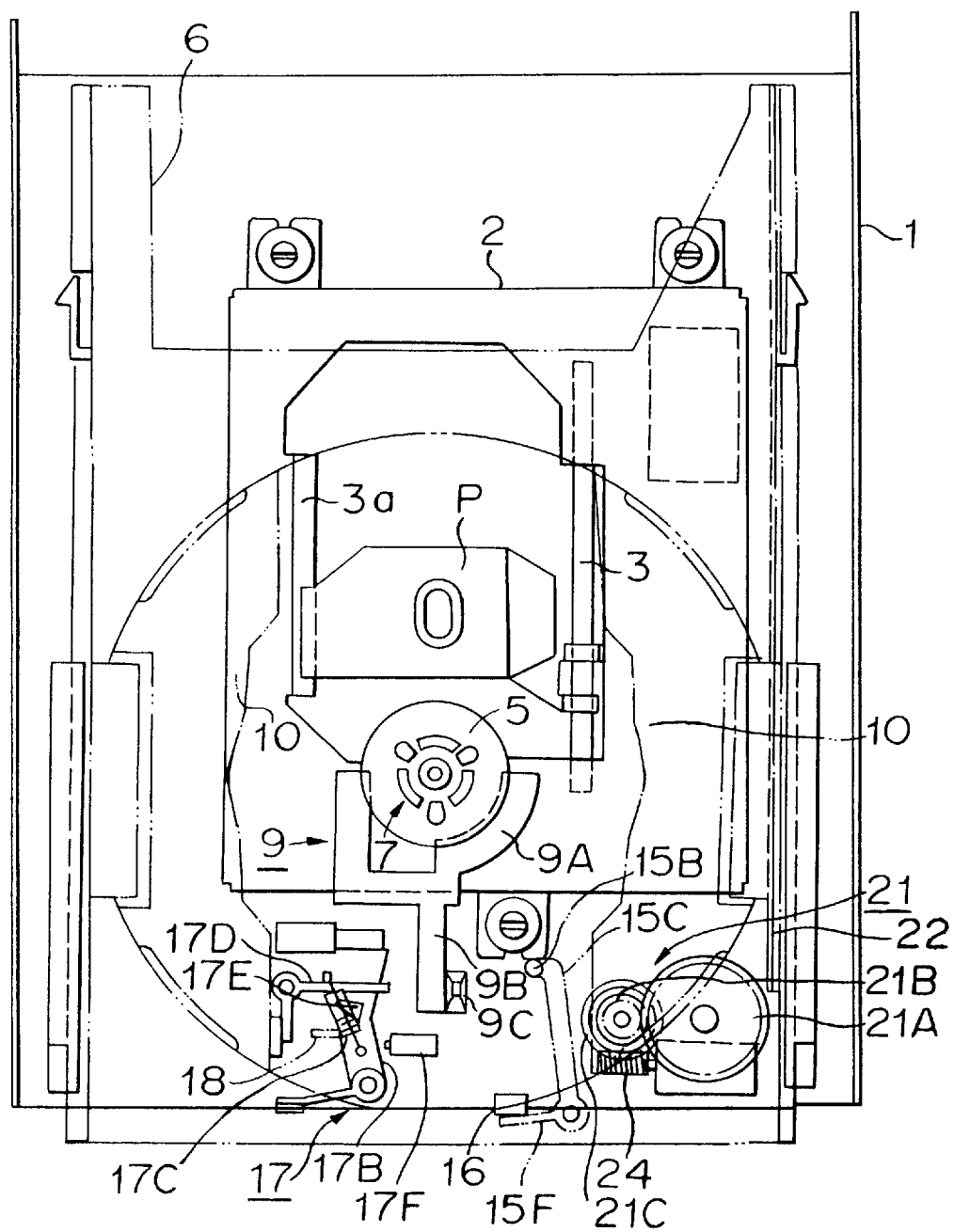
FIG. 1 is a plan view which shows a first embodiment of this invention.
Figure 2:
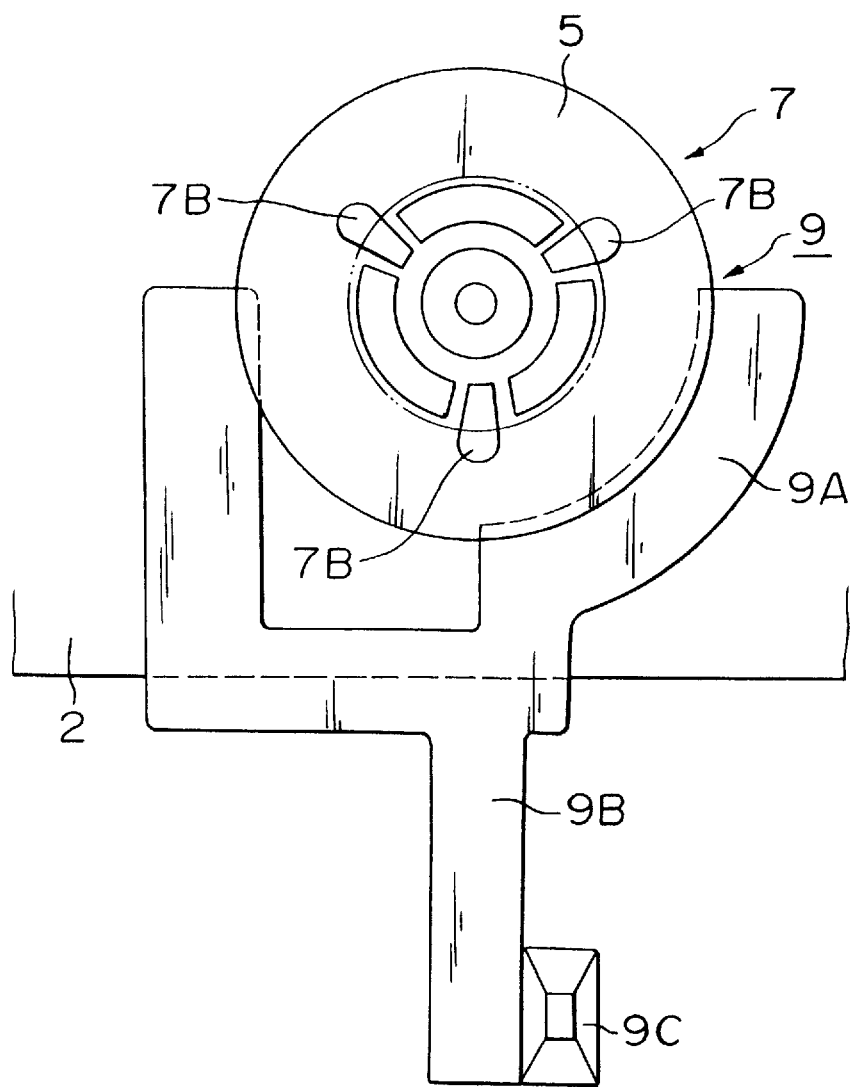
FIG. 2 is an enlarged plan view of a chucking means of the above first embodiment.
Figure 3:
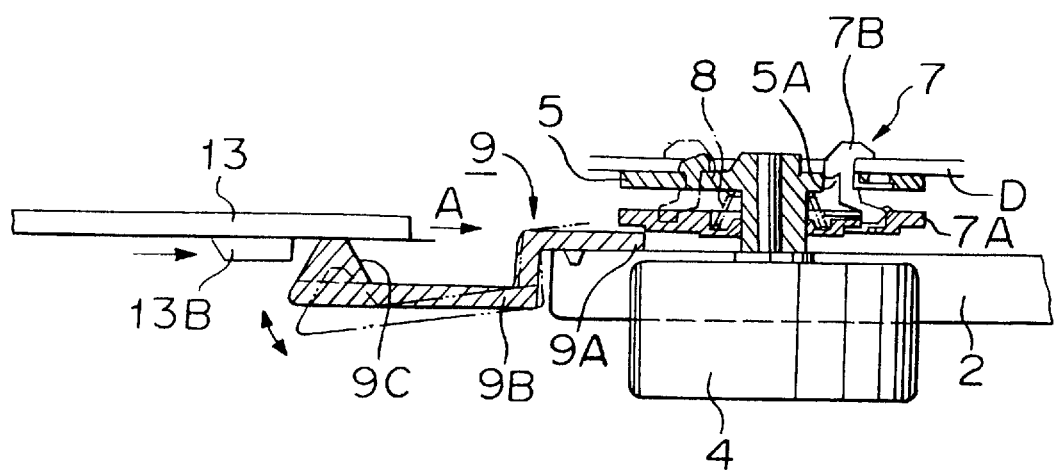
FIG. 3 is a longitudinal side view of the chucking means in FIG. 2.
Figure 4:
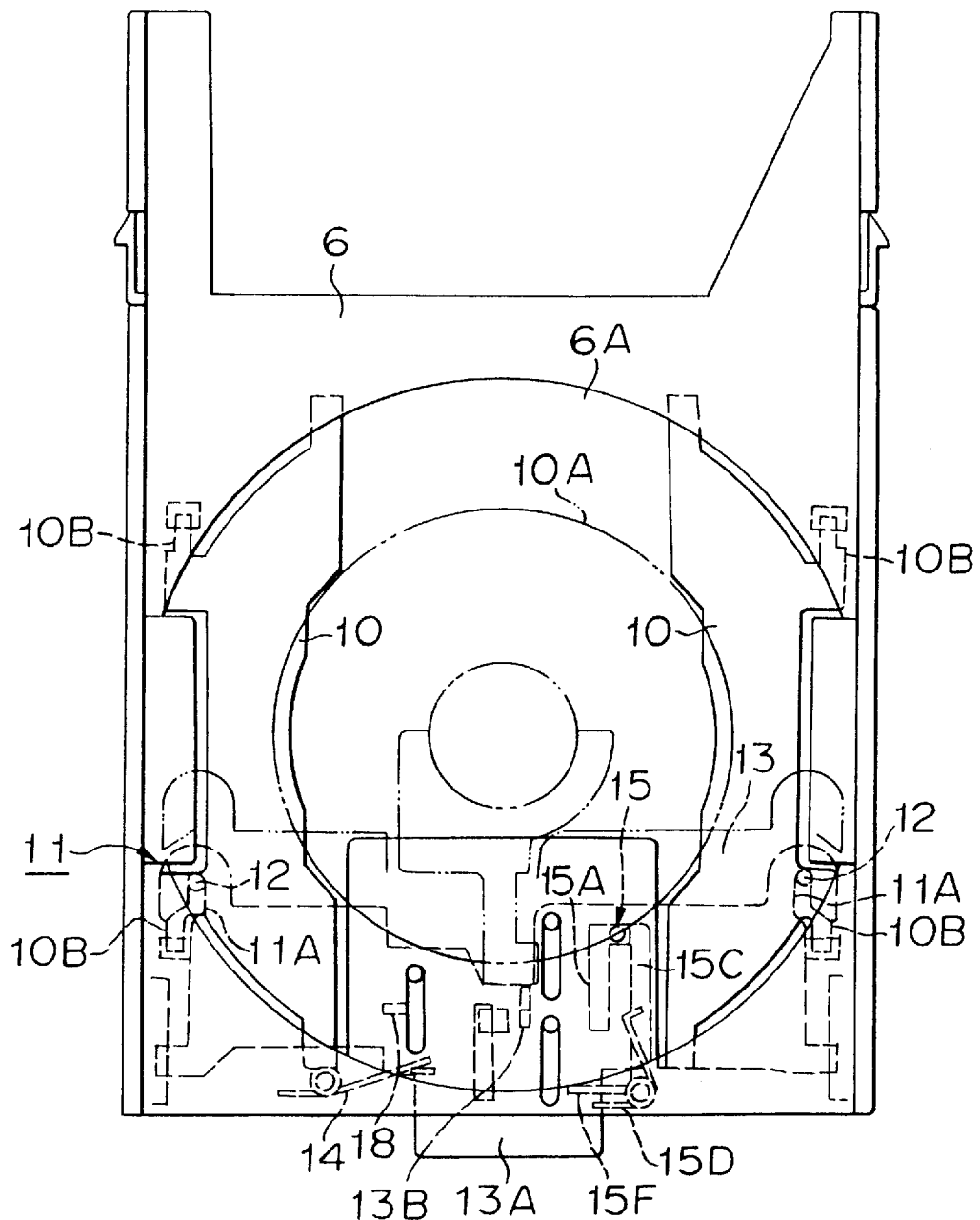
FIG. 4 is a plan view which shows a material portion of the above first embodiment.
Figure 5:
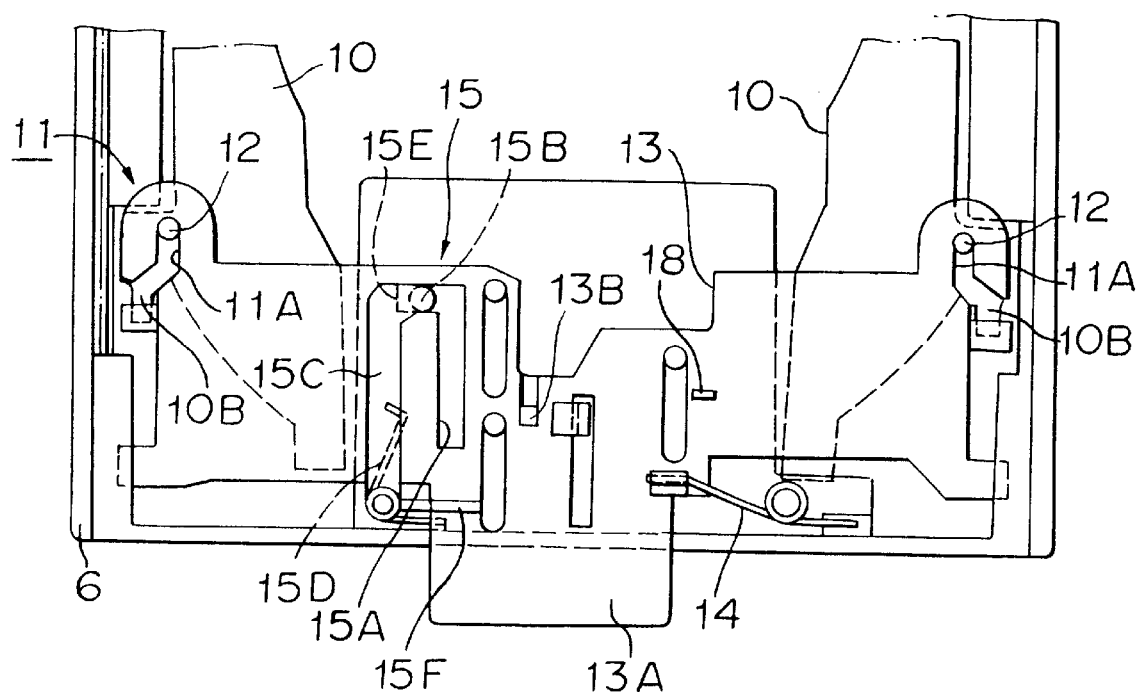
FIG. 5 is an enlarged bottom view of a material portion of the above first embodiment.
Figure 6:
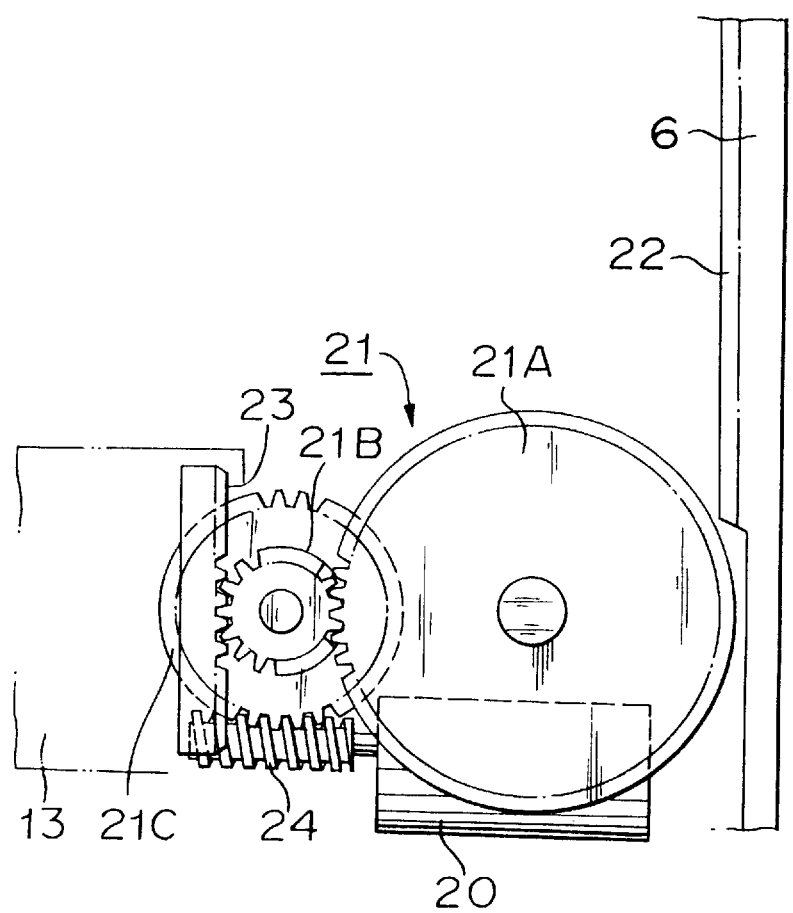
FIG. 6 is a plan view which shows a driving means of a tray of an inner side of a device box body of the above first embodiment.
Figure 8:
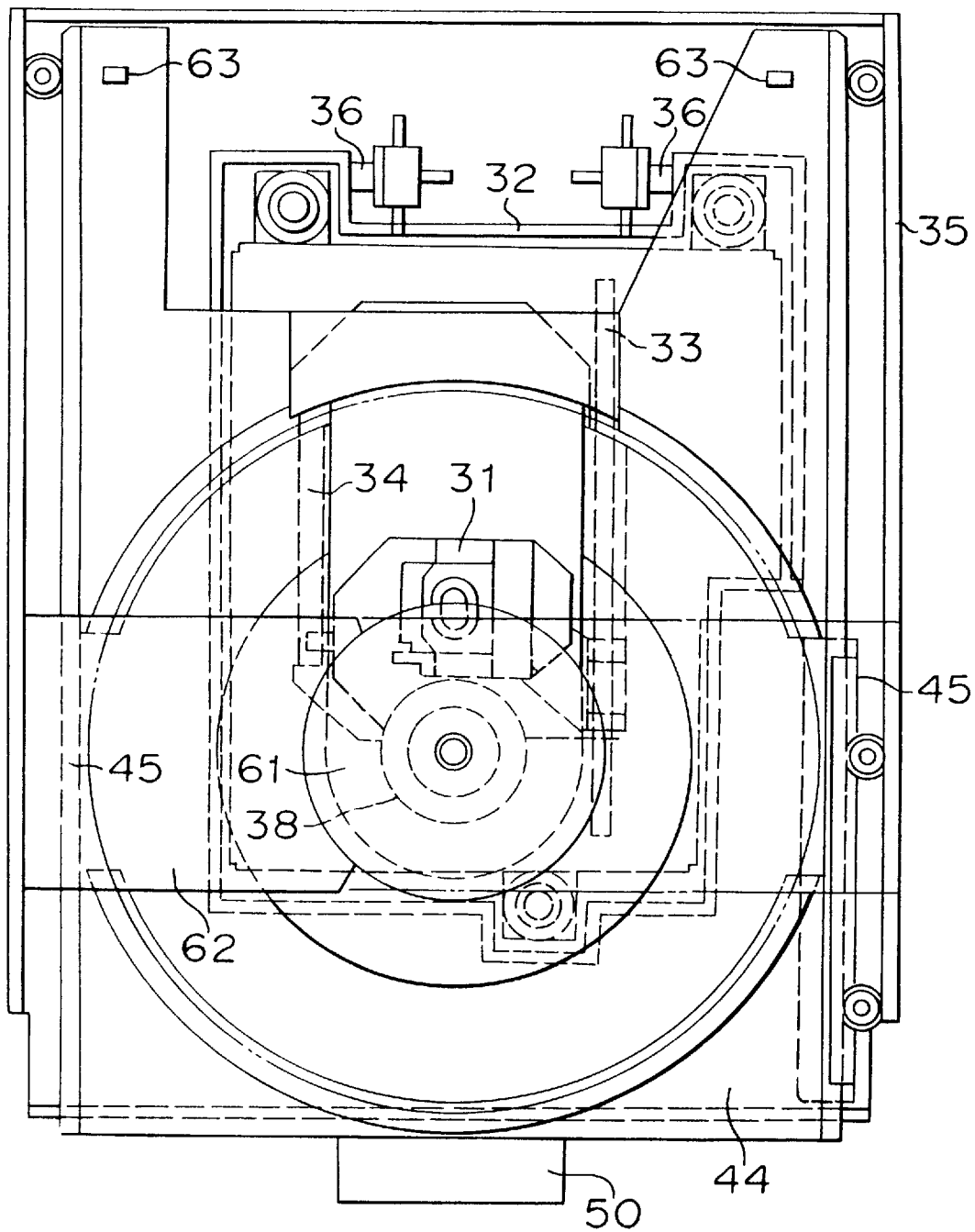
FIG. 8 is a view describing a second embodiment of this invention.
Figure 9:
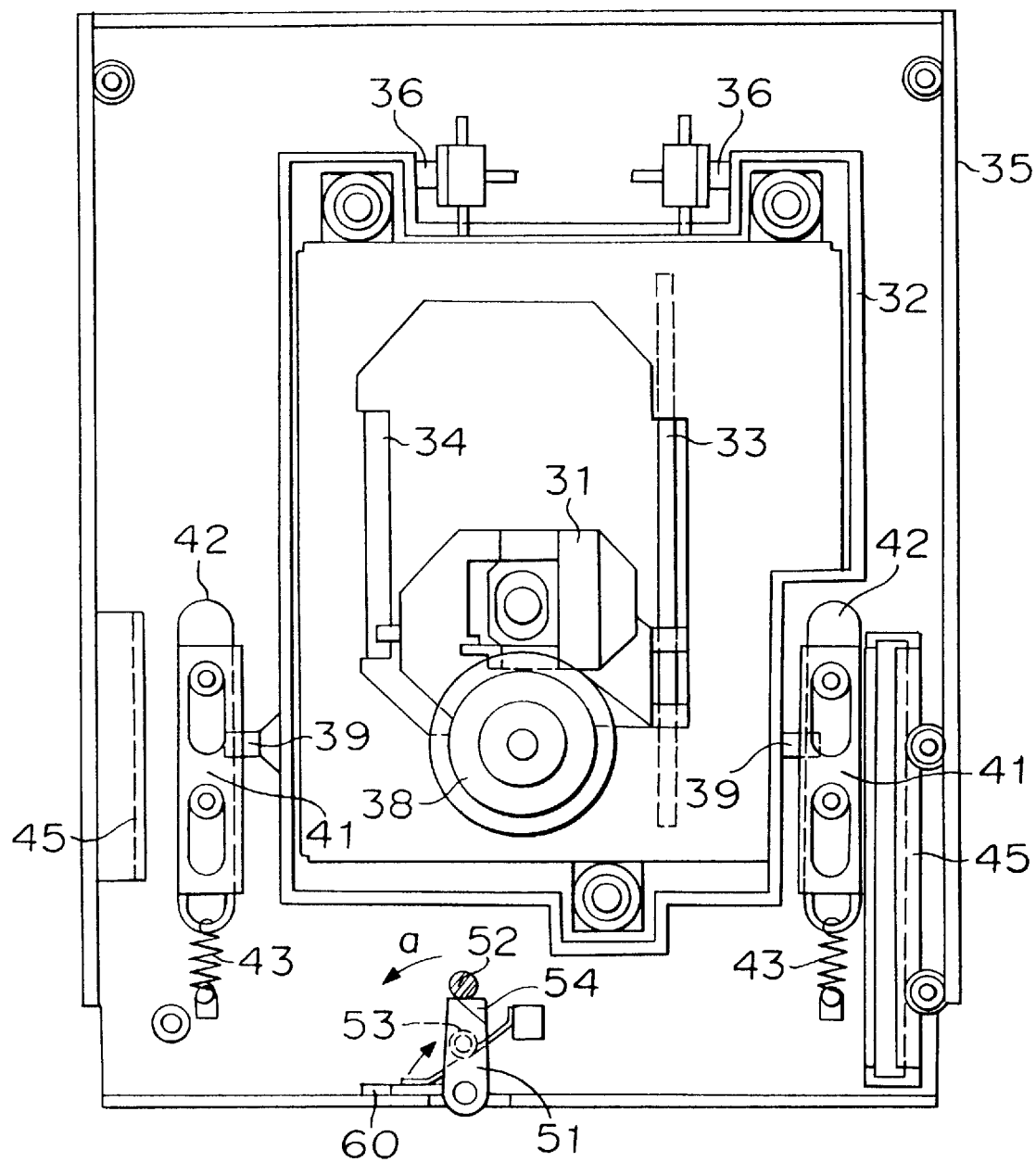
FIG. 9 is a plan view which shows a drawn-out state of the tray in the second embodiment.
Figure 10:
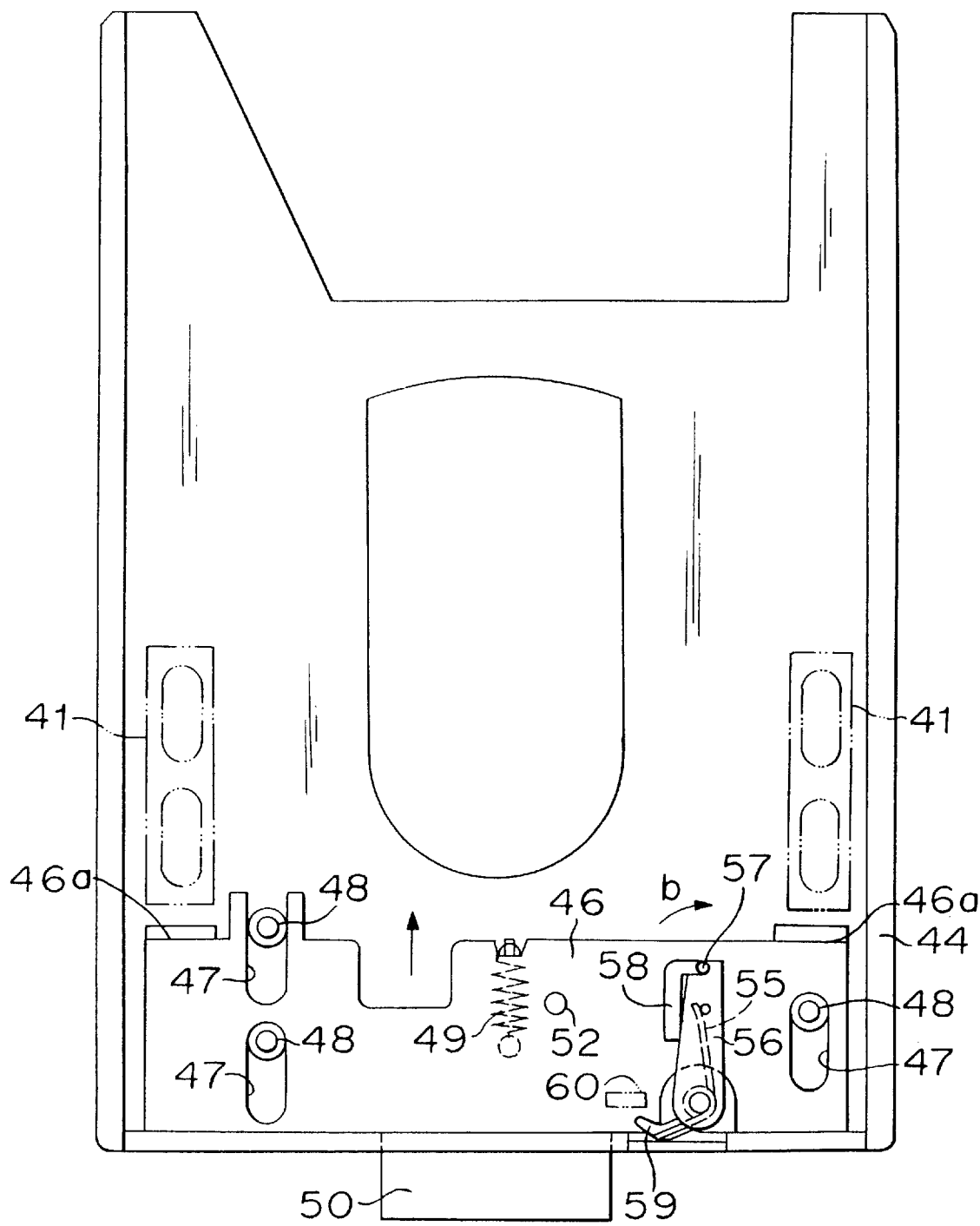
FIG. 10 is a plan view which shows a back surface of the tray of the second embodiment.

The first embodiment of this invention is explained in more detail with reference to FIG. 1 to FIG. 7.

The disc loading of this invention is provided with a chassis 2 in a box body, an optical pickup P supported by guide rails 3, 3*a* so that said pickup may move in a radial direction of the disc D along the chassis, a motor 4 for disc driving which is mounted at the disc charging position on the chassis, and a tray 6 which loads the disc D onto the turntable 5 rotatably driven by said motor 4.

In particular, the chucking means 7 for holding the disc D on the turntable 5 in the disc loading device of this invention is provided with a disc-shaped chucking member 7A installed under the turntable 5, a plurality (three pieces in this embodiment) of guide holes 5A formed at the center of the turntable 5, opposing the inner side edge of the holes, and chucking hooks 7B which freely latch or unlatch said disc by protruding on the turntable 5 through said guide hole 5A, when the chucking member 7A activates.

The chucking means 7 is explained in further detail. Said chucking means is provided with an elastically supporting mechanism 8 (e.g. a compress coil spring) which supports the chucking member 7A elastically from the turntable 5 downward, and an ascent and descent means 9 which raises and lowers the chucking member 7A by linking with tray 6 for disc loading at the time of charging. The compressed coil spring 8 is bridged between the turntable 5 and the chucking member 7A and pushes the chucking member 7A downwardly. Said chucking hooks 7B direct its tip toward the outer side of the radial direction of the disc, and are guided through the guide holes 5A so that the hooks move by directing said hooks toward the outer periphery of the turntable 5 at the time of descent, and that the hooks move directing said hooks toward the center direction of the turntable 5 at the time of ascending.

The ascent and descent means 9 of this embodiment is provided with a lever member 9B having a fork-shaped supporting member 9A which supports the chucking member 7A from the lower side and a swinging means which swings the lever member vertically on the chassis, said lever member 9B forming a cheveroned cam portion 9C at the front end thereof. The chucking member 7A can perform a pushing up operation against the compressed coil spring 8 by urging the cam portion 9C by a means described hereafter.

The tray 6 is adapted to be guided to the front and the rear along the guide rail provided at both sides of the device box body 1, and further a pair of arrow-type disc maintenance members 10 and 10 are provided on the right and left sides by positioning at the disc placing portion 6A. At the disc holding members 10 and 10 a disc position having different diameters is formed, said disc-holding members 10, 10 are adapted to activate so as to be descended when the tray 6 is charged at the loading position. The disc-holding members 10, 10 which rotate around shafts 10B, 10B positioned at both sides of the tray 6 and extending to the front and rear are formed at the front and the rear ends thereof, respectively, thereby rotatably supporting them to the tray 6 thereby being operated by the disc ascent and descent means 11 provided at the tray 6 and being rotated with a center of a rotating shaft at said loading position, whereby the disc is descended onto the turntable 5.

This ascent and descent means of the disc 11 of this embodiment is provided with a cam guide 11A having a crank type groove which guides a pin-shaped cam follower 12 provided at disc holding members 10, 10 at the slide plate 13, said cam follower 12 within the cam guide 11A being guided in the tray side direction by the operation of the slide plate 23 whereby the disc holding members 10, 10 are adapted to be descended. The slide plate 13 which forms cam guides 11A at both sides thereof is positioned at the front portion of the tray 6 to be maintained slidably to the front and the rear thereby projecting the handling operation portion (knob portion) 13A forward from the front end of the tray 6. Further, an elastical supporting means (e.g. torsion spring) 14 which supports the slide plate 13 elastically toward the front is provided.

At the tray 6, a releasing means 15 which remains to lock the slide plate during the tray 6 moves to the loading position, and at the loading position, the lock of the slide plate 13 is released in a state where the disc maintenance members 10, 10 is descended by up and down means of the disc 11, is provided.

The means 15 is constituted by an L-type groove 15A extended to the front and the rear direction formed to the slide plate 13, a lock lever 15C having a guided pin 15B guided to the guide groove 15A together with being rotatably supported by the tray side 6 and a torsion spring 15D which rotatably deflect the lock lever 15, and in a non-urging state of the handling operation, the slide plate 13 is fixed toward the user by the torsion spring 14. At this time, the guided pin 15B is latched to the latching portion 15E formed at the top end of the guide groove 15A by the action of the torsion spring 15A. Further, at the lock lever 15, a lock releasing portion 15E urged by the stopper 16 provided at the device box body side is formed when the tray 6 is inserted into the loading position of the disc, said lock releasing portion 15 acting so as to release the guided pin 15B from the latching portion 15E by rotating against the torsion spring 15D.

Further, a convex operational portion 13B which pushes down the cam portion 9C and goes over it at the time of charging the tray 6 is formed corresponding to the up and down lever 9B of said ascent and descent means 9. Just before the chucking, the movement of chucking hook 7B in the vertical and the disc radial directions is carried out.

At this time, the guided pin 15B of the lock lever 15C is guided to the guide groove 15A whereby the slide plate 13 is operated in the direction of arrow A by the handling operational portion 13A.

At the device box body 1, the tray 6 is maintained at the loading position of said disc and a latching means 17 which maintains the lock means 15 at its position is provided. This latching means 17 is provided with a latching lever 17B swung by solenoid 17F and a swinging lever 17D linked with a latching lever 17B through an extension spring 17C, said latching lever 17B being provided with a protruding latching portion 17E, said latching portion 17B being adapted to latch a pin-like linked portion 18 provided at the slide plate 13 at the rear side thereof in a state when the solenoid is not in action. The swinging lever 17D is urged by the linked portion 18 just before the final step thereof at the time of charging the tray 7, thereby inducing the linked portion 18 to the rear side of the latching portion 17E. The solenoid 17F rotates the latching lever 17 in the operational state thereof to release the latching state.

At said device box body 1, a motor 20 for driving the tray is provided and a gear row 21 is connected to the motor shaft thereof. The tray 6 is provided with a first rack 22 which is able to engage with a first gear 21A of the gear row 21, which at the slide plate 13 is provided with a second rack 23 which is able to engage with a second gear 21B of the gear row 21. In this embodiment, the above gear row 21 is constructed in one axial body with a worm gear 21B which engages with a worm 24, and the gear row 21 engages with a gear 21A and 21B.

Although the gear 21A rotates due to the drive of the motor 20 at the time of the tray charging and the automatic charging is carried out by the action of the rack 22 engaged with said gear 21A, each rack 22, 23 is connected to said gear row 21 so that the second rack 13 may be engaged together with release of the engagement with the first rack 22 at the loading position thereof.

In such a construction, the tray 6 is placed on the disc (in the embodiment, a smaller disc is placed on the holding area 20) and inserted into the opening at the front of the box body 1. In this case, since the guided pin 15B is latched with latching portion 15E, the tray 6 operates integrally with slide plate 13, but at the step when the disc is led on the turntable 5, the lock leasing portion 15F is urged by the stopper 16 and the guided pin 15B is guided to the guide groove 15A whereby the slide plate 13 can be operated to the front and the rear with respect to the tray 6.

In this state, the engagement of gear 21A with the first rack 22 is released whereby the gear 21B is engaged with the second rack 23. As a result, the slide plate 14 is introduced into the device box body 1 and induces the cam follower 12 within the cam guide 11A to rotate the disc maintenance members 10, 10 around axis 10B, 10B. Thus, the disc descends onto the turntable 5. On the other hand, the cam portion 9C is once pushed down by operational portion 13B at the advancing step just before the disc charging position by the action of the slide plate 13. Thus, the chucking member 7A is allowed to ascend by supporting portion 9A by rotating the lever member 9B.

As a result, the chucking 7B is induced into the introducing hole 5A to ascend and the tip of the hook retreats into the inner side of the disc radial direction.

Accordingly, there is no obstruction for placing the disc on the turntable 5.

Soon after the disc is placed on the turntable 5, the operational portion 13B gets over the cam portion 9C whereby the chucking member 7A descends by the action of the compression coil spring 8 whereby the chucking hook 7B is induced into the introducing hole 5A. However, since the tip of the hook thereof advances to the outside of the radial direction of the disc, said hook tip latches with the inner edge of the charging hole of the disc whereby the disc can be fixed to the turntable 5.

In this case, the linked portion is latched to the latching portion by the action of the latching means 17. By this, the slide plate 13 and the tray 6 maintain the lock state thereof until the solenoid 17F is operated. Thus the optical pickup P can read disc information or write in.

When the solenoid 17 F operates and the latching means 17 is released, the slide plate 13 retreats and the chucking means 7 is also released, and the disc maintenance members 10, 10 ascend whereby the disc is taken away from the turntable 5 to disc placing portion 6A. Thus, the disc is returned to the tray 6 and the tray 6 can be drawn out of the box body 1.

This embodiment as described above in detail is a disc device which comprises a chassis having a motor for disc driving together with equipment which enables movement of an optical pickup and a tray for loading the disc to said turntable of the motor;

said tray being provided with a disc maintenance member, an ascent and descent means for loading a slide plate which operates this means to the front and the rear, and a lock means which releases the lock at said loading position together with maintaining the lock state of said slide plate up to the loading position thereof. Further, the box body of said device is provided with a motor for tray driving and a gear row is connected to said motor shaft. A first rack which is able to engage with a first gear of said gear row is provided at the tray, while a second rack which is able to engage with a second gear of said gear row is provided at the slide plate, each rack being connected with said gear row so that the engagement of the first rack may be released and the engagement of the second rack may be carried out at the loading position. Accordingly, the operations of the tray and the slide plate become simple, and the construction of the device as a whole also becomes simple thereby, being enabling a reduction in the number of parts.

As shown in FIG. 7, a first and a second print circuit substrates 25, 26 connected to a main print circuit substrate 24 are arranged in a long form from front to rear and vertically by positioning at the side of the supporting chassis 27 of the optical pickup P and at the second print circuit substrate 26 an output jack 28 such as a headphone, etc. is provided by positioning at the front portion thereof.

The second embodiment of this invention will be described as follows with reference to FIGS. 8 to 11.

In this invention, the optical pickup is provided to the radial direction of the disc, and especially in this embodiment, the guide is carried by the guide axis 33 and guide rail 34 provided at drive chassis extended to front and rear. The ascent and descent chassis is rotatably supported its rear end portion by hinge 36 provided at the inside of the box body 35. Further, a motor for disc driving 37 and turntable 38 connected directly to the motor shaft are provided before the hinge.

At both sides of the ascent and descent chassis 32, the guided portion 39 is provided in a guide pin state and further a guide member 41 having the guide groove 40 having crank type which guides the guided portion 39 is supported slidably so as to be guided by rail 42 extending to front and rear provided at both sides of the device box body 35, said guide member 41 being pulled forward by the extension spring 43.

The tray 44 on which the disc is placed is guided by the guide rail 45 provided at device box body 45 from the opening at the front surface of said device box body 35 and is adapted to be charged in the device box body 35, the lower surface of said tray 44 being provided with a slide plate 46 which urges the guide member 41. At the slide plate 46 is formed a guide slit 47 extended to the front and the rear and a guide pin 48 provided at the lower surface of the tray 44 is inserted into the guide slit 47 thereby guiding the slide plate 46 in the front and rear directions. An extension spring 49 bridged between the slide plate 46 is pulled forward.

At the slide plate 46 is formed a handling operational portion 50 extruded forward. When the tray 44 urges extension spring against it in a charging state within the device box body 35, urges the guide member 41 outward by urged portions 46a, 46a provided at the rear portion of the slide plate 46 thereby being adapted to enable to move.

Further, the lock means for maintaining the ascent state of the ascent and descent chassis 42 is constructed by a lock lever 51 arranged within the device box body 35 and a latching pin 52 provided at the lower side of the slide plate 46, said lock lever 51 being able to rotate around the axis and being energized in the direction of the arrow by the torsion spring 53. At the top end of the lock lever 51 is formed a triangular latching and guide portion 54 and when the slide plate 46 is urged, the lever 51 rotates in the direction opposite the direction of arrow "a" in FIG. 9 according to the movement of the latching pin 52, and then the latching pin latches with latching guide portion 54 at the position of FIG. 9, thereby being locked.

Figure 11:
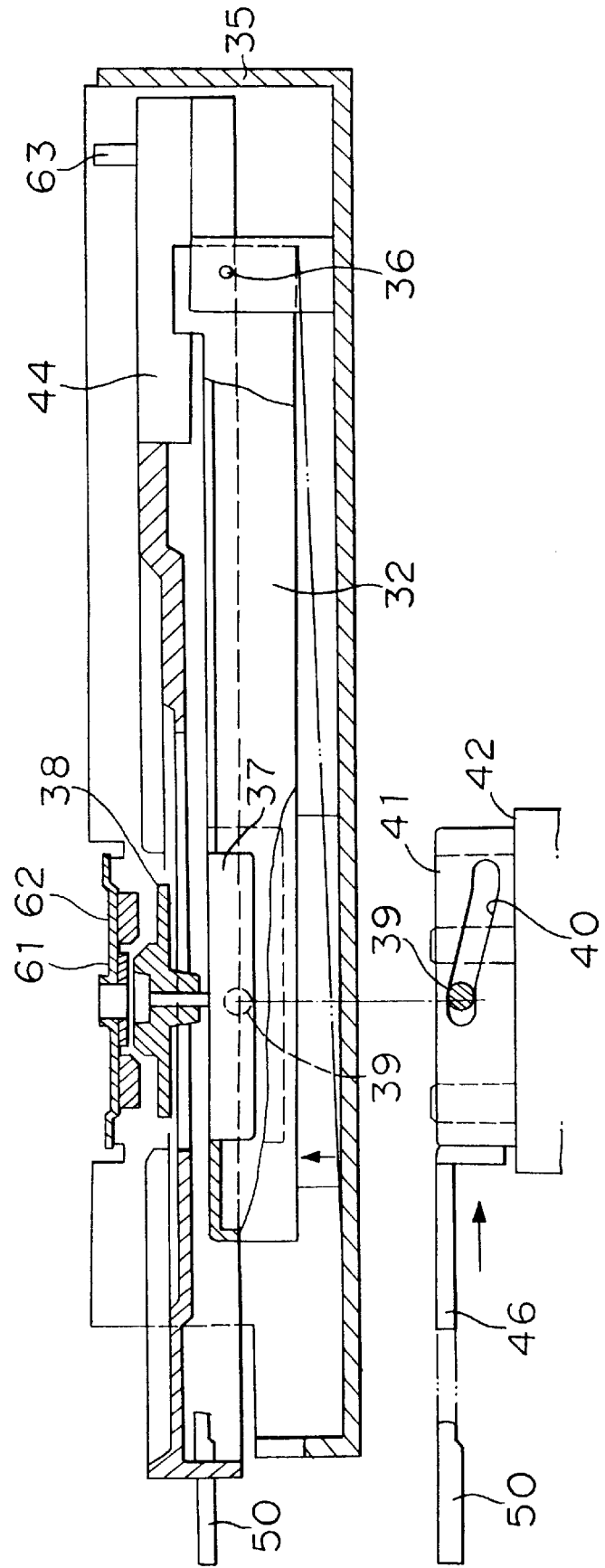
FIG. 11 is a side view which shows an ascent and descent mechanism of the ascent and descent chassis in the second embodiment.

In the above embodiment, in order to prevent the urging operation of the slide plate 46, the second lock means is provided until the tray 44 is inserted into the device box body 35. The above lock means is constructed by a lock lever 56 rotatably supported at the tray 44 side, a guide pin 57 provided at lock lever 56 and an L-type slit 58 provided at the slide plate 6 for guiding the guide pin 57 together with being energized in the direction of arrow "b" in FIG. 10 by torsion spring. At the lock lever 56, an operational lever portion 59 is formed at the base end portion thereof and is urged by an urged element 60 provided at the device box body 35 when the tray 44 is charged, thereby removing the guide pin 57 from the lock portion of the slit 58 to move the slide plate 46. The numeral 61 in FIG. 11 is a chucking means of a disc having a magnetic type provided at the upper portion of the device box body 35 against the turntable 38.

In such construction, though the tray 44 and the slide plate 46 move integrally when the tray 44 is inserted from the opening of the device box body 35, the second lock means operates by the operation of the urged element 60 at the final step of the charging thereby enabling the urging operation of the slide plate 46. In this state, when the handling operational portion 50 is operated, the urging portion 46a of the slide plate 46 abuts against the guide member 41 whereby the guide members 41, 41 move to the rear. As a result, the guided portion 39 of the ascent and descent chassis 32 is guided by the groove 40 whereby the ascent and descent chassis ascends. Gradually the turntable 38 ascends, thereby lifting up the disc to fixedly support the disc by chucking means 61. At the final step of the operation of this handling operational portion 50, the latching and guide portion 54 urges by the latching 52, and rotates the lock lever 51 against the torsional spring 53 and goes to the rear thereof by pushing away the latching and guiding portion 54. At this time, the latching and guide portion 54 returns by the torsional spring force 53 at the top end thereof. As a result, the ascent and descent chassis 32 is maintained in the ascending position.

Further, the lock releasing means (not shown) of the solenoid mechanism and the like rotates the lock lever 51 at the time of taking out the tray 44 and acts so as to release the latching of latching and guide portion 54. The slide plate 46 thus returns forward to release the urge of the guide member 41, thereby descending the ascent and descent chassis 32. By this, the disc returns on the tray 44 whereby the tray 44 can be taken out from the device box body 35.

Thus, according to this invention, the ascent and descent operation of said chassis 32 can be carried out by handling by way of a simple mechanical construction after tray charging without using a motor or the like.

In the above embodiment, the ascent and descent of the turntable 38 is carried out by rotating the ascent and descent chassis 32 through the rear hinge 36. However, this may also be carried out by installing the guided portion 39 at the front and rear of the ascent and descent chassis 32 and providing the guide groove 40 corresponding to this by maintaining said chassis horizontally.

Further, this may be constructed to raise and lower the chassis 32 by providing a guide member such as boss or the like at the device box body 35 (not shown).

In this embodiment, a beam member (chucking arm) 62 having a chucking means 61 is bridged at the right and the left of the device box body 35 and a projection 63 which latches to the beam member 62 is provided at the top end of the tray 44 thereby using it to prevent the tray 44 from being drawn out from said device box body 35.

In this embodiment, since the guided member which raises and lowers a guided portion by installing it to said chassis is provided at both sides of said chassis so as to move to front and rear of the device box body, a slide plate which urges said guide member to the tray and a lock means which latches with the slide plate so as to be able to the latch or to separate, the slide plate can be operated in the tray charging state whereby there is no need of motor and transmission means to the ascent and descent chassis. Accordingly, simplification of construction of the device and of the lock means can be obtained.

The third embodiment of this invention is described as follows with reference to FIG. 12 to FIG. 18.

In the figures, 65 is a case body which forms a box shape having an opening at the upper and front surfaces, and three cut-away portions 67 are formed at the inner sides of both side walls, respectively. The numerals 69, 69A are plastic guide members, said guide members 69, 69A inserting projections 67 into three holes 68 and fixed to the side 68. Guide grooves 70 are formed at guide members 69, 69A, and at a front end of the guide groove 70 is formed a spring convex portion 71. At the lower portion of the front end of the guide members 69, 69A there is integrally formed a roller shaft, and a guide roller 74 is attached to the roller shaft 72. At the rear end of the guide member 69, a bent portion 75 is formed.

The numeral 76 is a ceiling or cover plate installed at the upper portion of the case body 65, said ceiling plate 76 being positioned by latching a tongue piece 77 formed bendingly downward at both sides thereof with a hook portion 78 formed at the front ends of the upper portion of the guide member 69 thereof fastening the rear potion of the ceiling plate with a vis to a cut-away portion of the case body 65. Further, the upper portion of the holes 68 of said guide members 69, 69A form a receiving portion 81 for receiving the ceiling plate 76 thereof supporting the ceiling plate 76.

The numeral 82 is a slide chassis made of a plate inserted within said case body 65 slidably, and a sectional surface thereof forms a nearly "⊐" shape, a guide portion 83 formed by outwardly bending upper edge of the rear portion of both side walls 83, 83 of said section, a surface being inserted into the guide groove 70 of the guide member 69 thereby being moved.

In this embodiment, the projection 83b is also formed at the guide portion 83.

A tray 84 is attached to the front portion of said slide chassis 82 and further a chassis assembly 85 is attached with this tray 84. The chassis assembly 85 is provided with a turntable, pickup 87, motor and other main mechanisms of the disc device not shown in the Figures.

Figure 17:
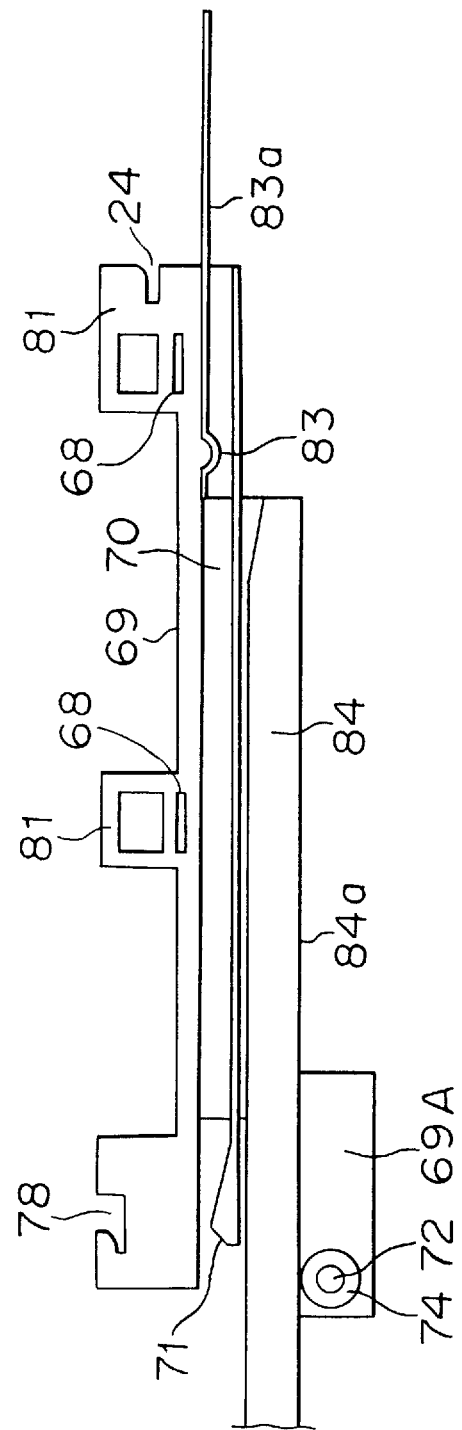
FIG. 17 is a view which shows insertion of the guide member, slide chassis and the tray of the third embodiment.

FIG. 17 is an explanation view which shows an inserting state between the guide groove 70 of the guide member 69 and a guide portion 83a of the slide chassis 82, and a relation between a lower edge portion 84a of the tray 84 and the guide roller 74.

As shown in FIG. 17, the rear portion of the slide chassis 82 is supported by guide groove 70 of the guide member 69, which the front portion of the slide chassis contacts with guide roller 74 by the lower edge 84a of the tray 84 thereby being guided by guide roller 74.

By the above construction, the slide chassis 82 slides to front and rear along the guide groove 70 of the guide members 69, 69A whereby the tray 84 is stored or drawn out. At this time, the contact of slide chassis 82 and the guides members 69, 69A is the touch of plate and plastic, and the lower surface of the tray 84 contacts with guide roller 74. Accordingly, the friction resistance of the contact is small whereby a smooth slide is possible.

Further, since a projection 83b is formed at the guide portion 83a of the slide chassis 82, when the slide chassis 82 is drawn out, if the projection 83b passes through the convex portion 71 provided at the top end of the guide members 69, 69A, a feeling of click can be obtained because the convex portion 71 passes a spring, whereby a drawn out state of the slide chassis 82 can be accurately recognized.

Figure 12A:
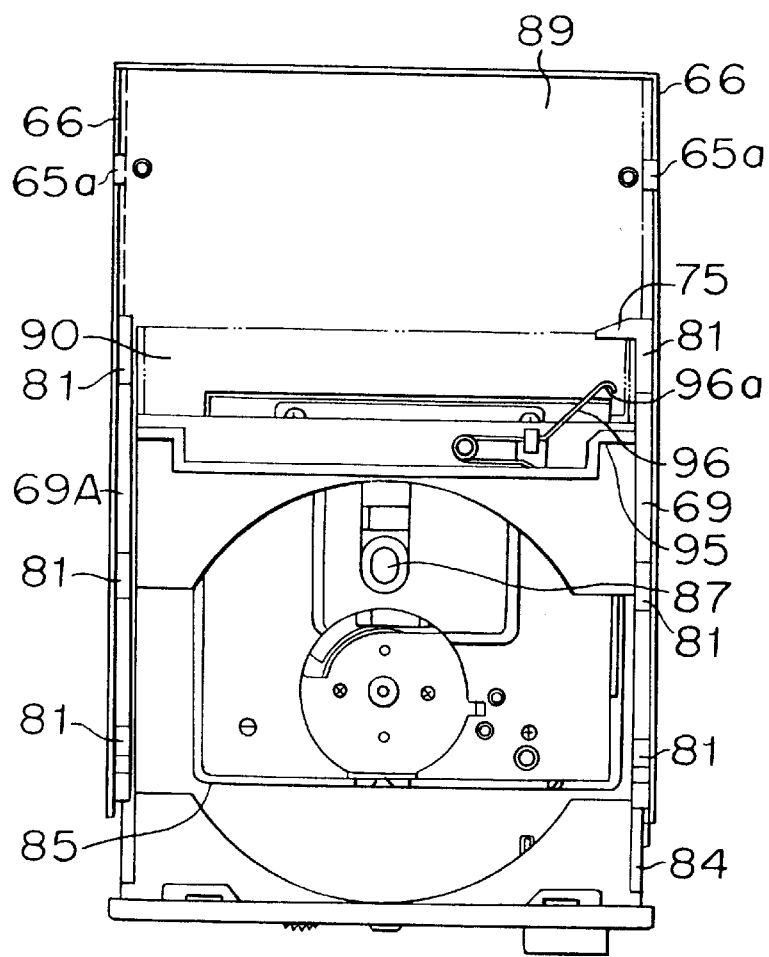
FIG. 12 is views of box body construction of the disc device according to the third embodiment of this invention, and (a) is a plan view, (b) is a longitudinal sectional view and (c) is an elevational view thereof.
Figure 12B:
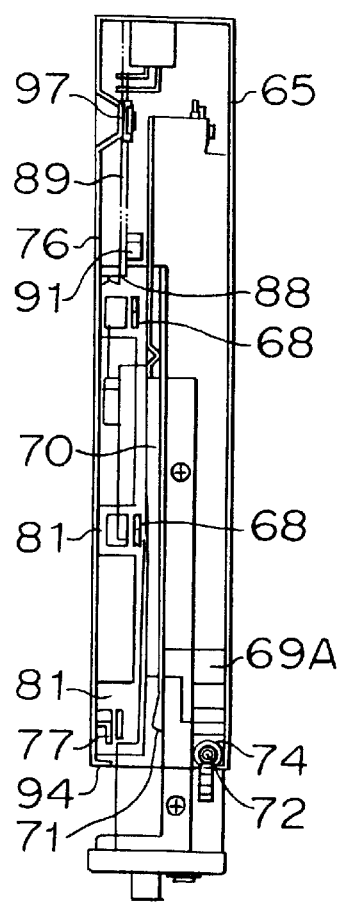
Figure 12C:
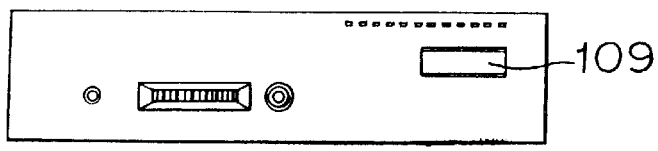
Figure 13:
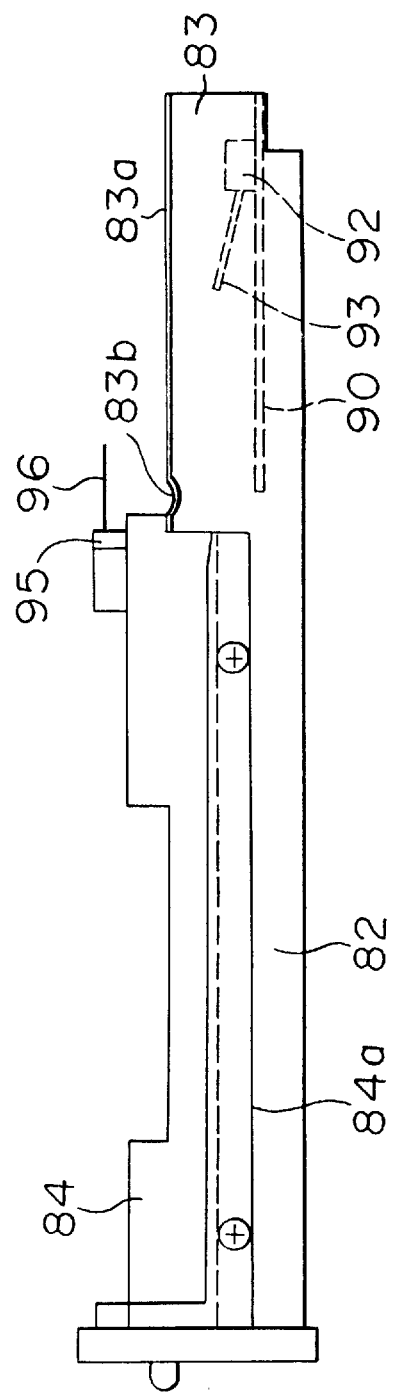
FIG. 13 is a side view of a slide chassis and a tray of the third embodiment.
Figure 14:
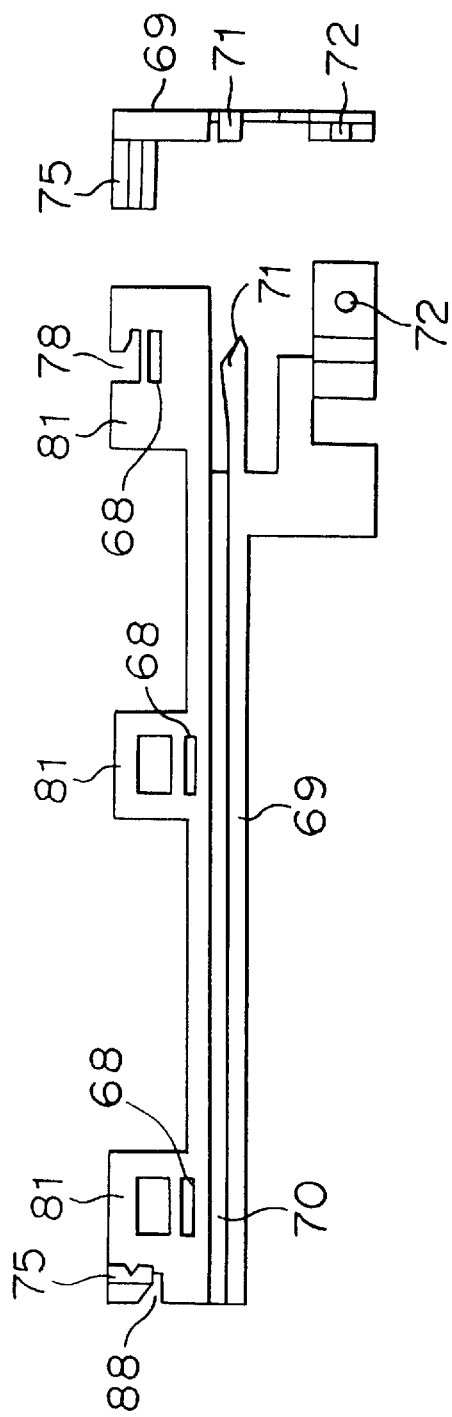
FIG. 14 is a guide member view of the third embodiment.
Figure 16:
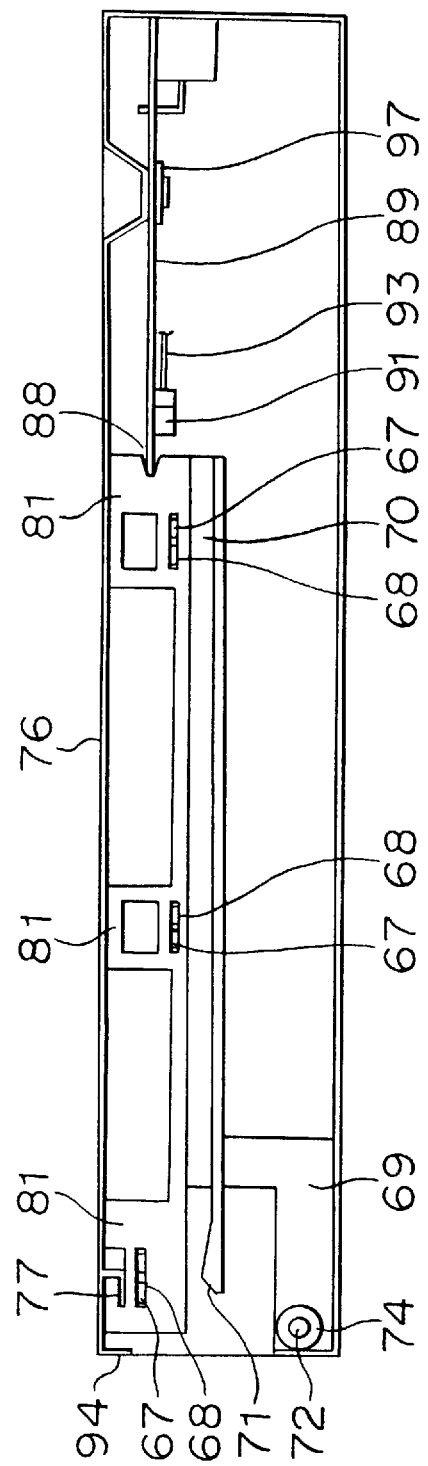
FIG. 16 is a longitudinal view which shows a ceiling plate and a guide plate of the third embodiment.

Furthermore, as shown in FIG. 12, a torsion spring 96 is attached to the rear portion of the tray 84 whereby the top end 96a of the torsion spring 96 is adapted to abut against the bending portion 75 having an L letter type formed at the rear end of the guide member 69.

Accordingly, at the time of ejection, when the lock of the tray 84 is released by the eject means (not illustrated), the tray 84 moves forward by the force of the torsion spring 96.

A concave groove 88 is formed at the rear surface of the guide members 69, 69A, the printed substrate 89 being fixed by inserting one end of the printed substrate 89 into the concave groove 88, while preventing another end with a vis at a cut-away portion 97 provided at case 65. Further, the printed substrate 90 is also attached to the rear of the tray 84.

Figure 18:
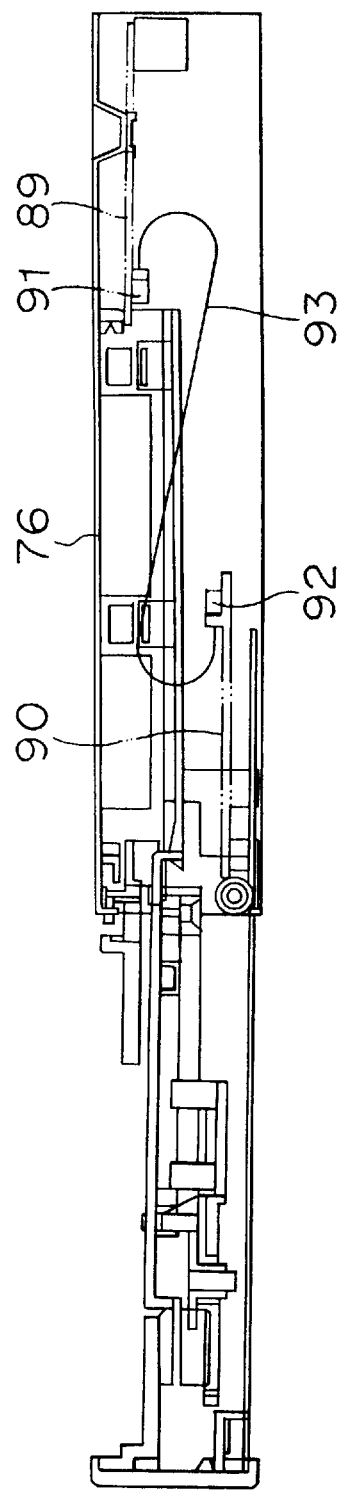
FIG. 18 is a longitudinal view when the tray is drawn out in the third embodiment.

Connectors 91, 92 are provided with printed substrates 89, 90 respectively, and a connected wire 93 such as flat cable or the like is connected between connectors 91, 92 (FIG. 18).

A stopper 94 bendingly formed like the letter L is provided at the front end of the ceiling plate 76 and a rib 95 formed at the rear of the tray 84 abuts against the stopper 94 when the slide chassis 82 is drawn out, thereby constraining the movement of the slide chassis 82.

Since this embodiment is constructed as above, the following effects can be obtained.

(1) Since a smooth slide can be obtained by the combination of guide member and slide chassis, a ceiling plate receiving portion is formed at the guide member, and the ceiling plate can be easily attached without use of other parts.

(2) Since a feeling of a "click" can be obtained when the slide chassis is taken out forward, the extended state of the tray can be recognized with a simple construction.

(3) Since an L-type bending portion is provided to the guide member, the tray is easily ejected.

(4) Since the ceiling plate can be positioned with a simple construction and the ceiling plate is supported at a plurality of portions of the guide members, the strength of the box body increases torque pieces, the drawing out of the tray can be performed with a simple construction.

(6) Since the attachment of print wiring to the box body, but also the attachment of the print substrate to the slide chassis is possible, effective use of a narrow space is possible.

(7) Since the guide roller can be attached to the guide shaft integrally with a guide member, there is no need to fix the chassis by caulking, and the number of parts can be decreased.

The embodiment of the driving device installed in the box body will be described as follows with reference to FIG. 12 and FIG. 19 to FIG. 21.

The box body 65 is provided with a tray 84 which can to move to front and rear and a chassis assembly 85 is attached to this. A main mechanism of the disc device such as a turntable, pickup 87 and the like described hereafter are attached to the chassis assembly 85 and when the tray 84 is positioned at a certain position, the pickup 87 can read a recorded signal on the optical disc placed on the turntable.

Figure 19:
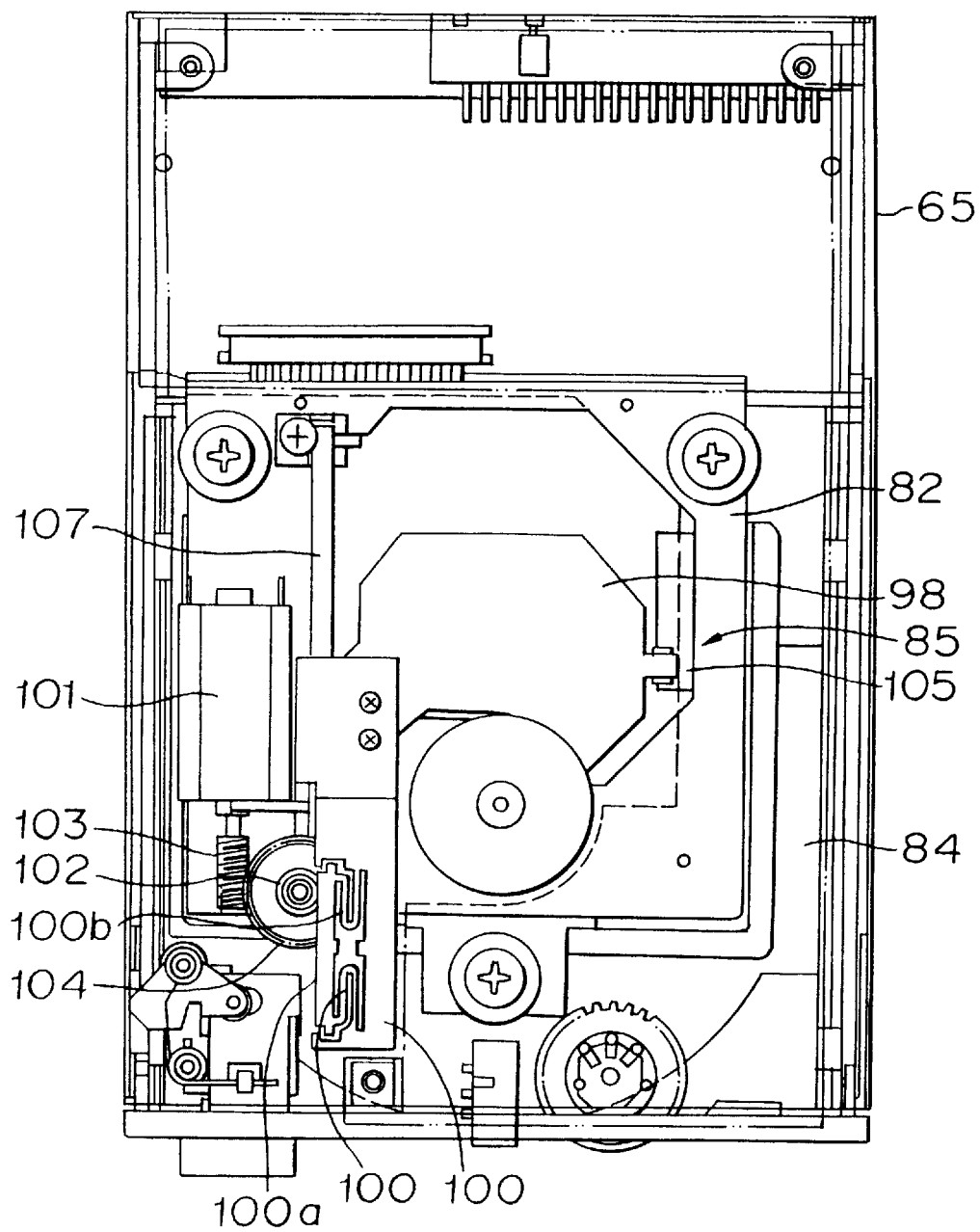
FIG. 19 is a back surface view of the construction of the box body in the third embodiment.

FIG. 19 shows the tray 84 set at a certain position.

Figure 20:
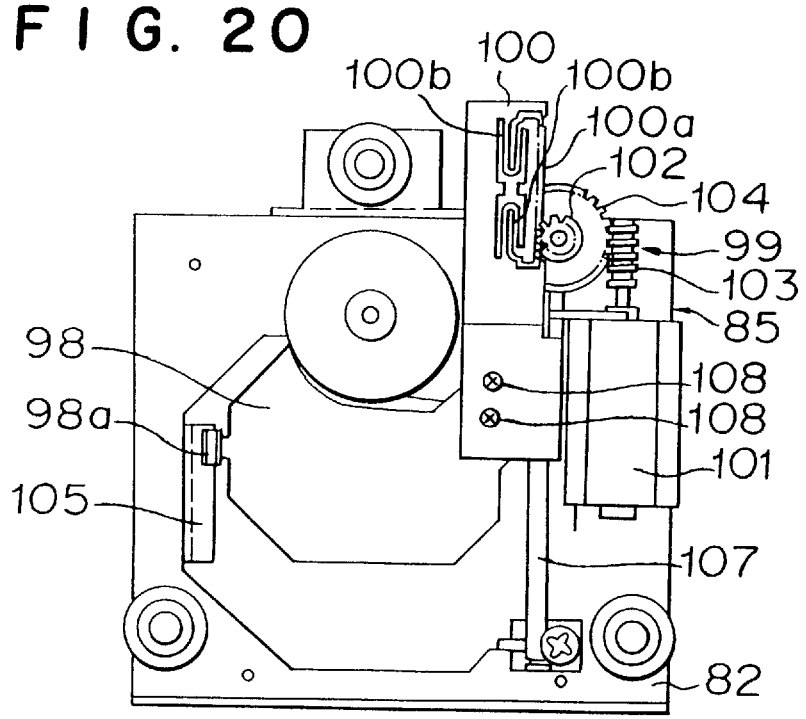
FIG. 20 is a plan view which shows a disc device wherein the driving device is used in the third embodiment.
Figure 21:
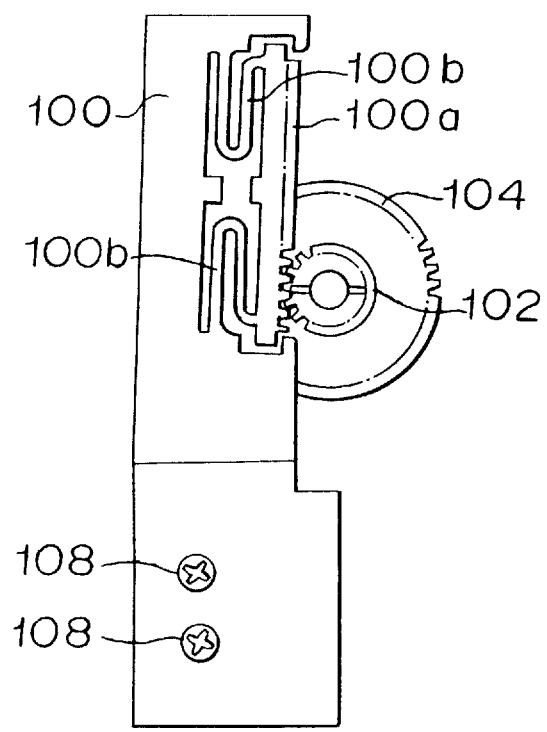
FIG. 21 is an enlarged view which shows a part of FIG. 20.
Figure 23:
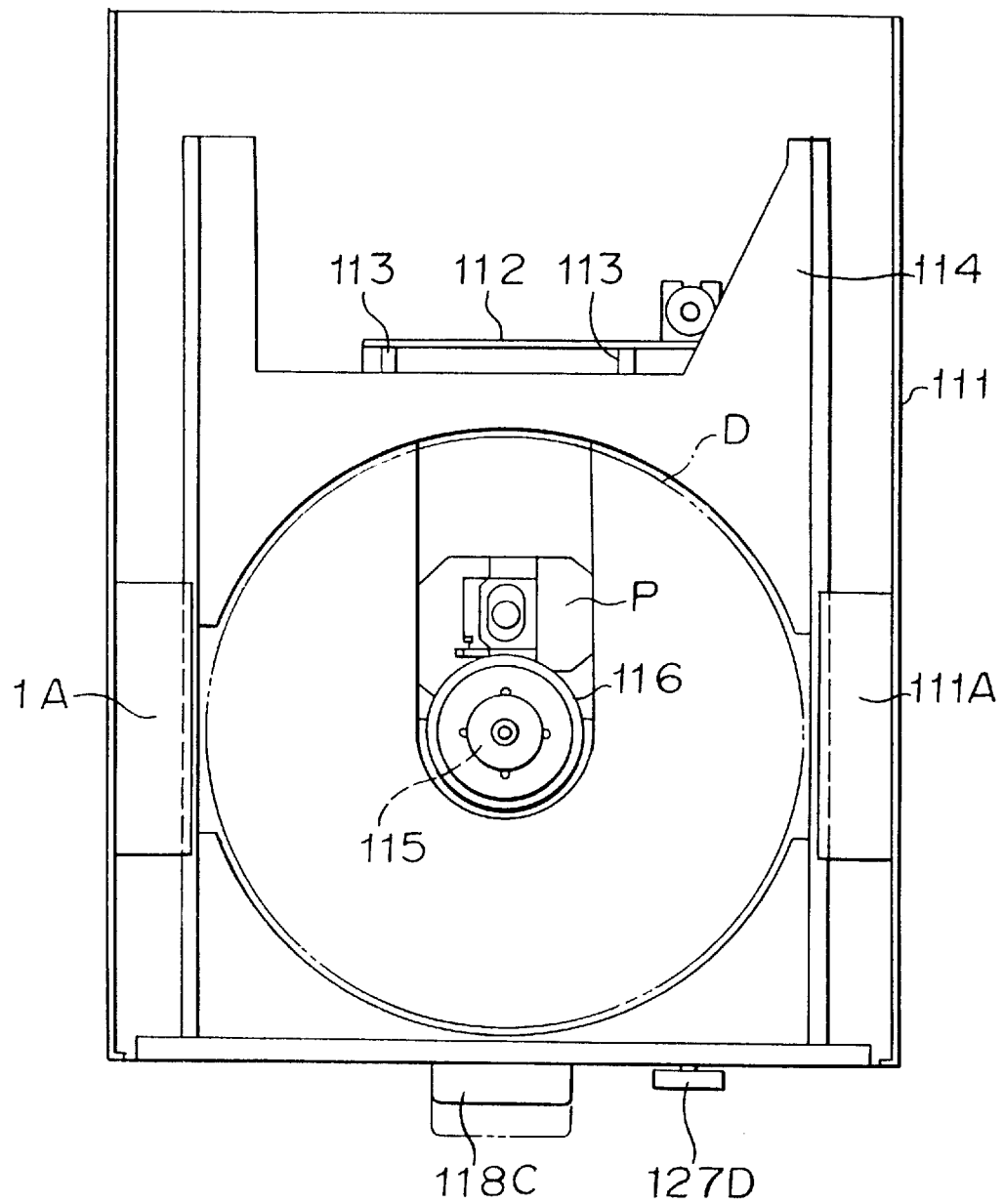
FIG. 23 is a plan view of the tray charging state which shows a fourth embodiment of this invention.
Figure 24:
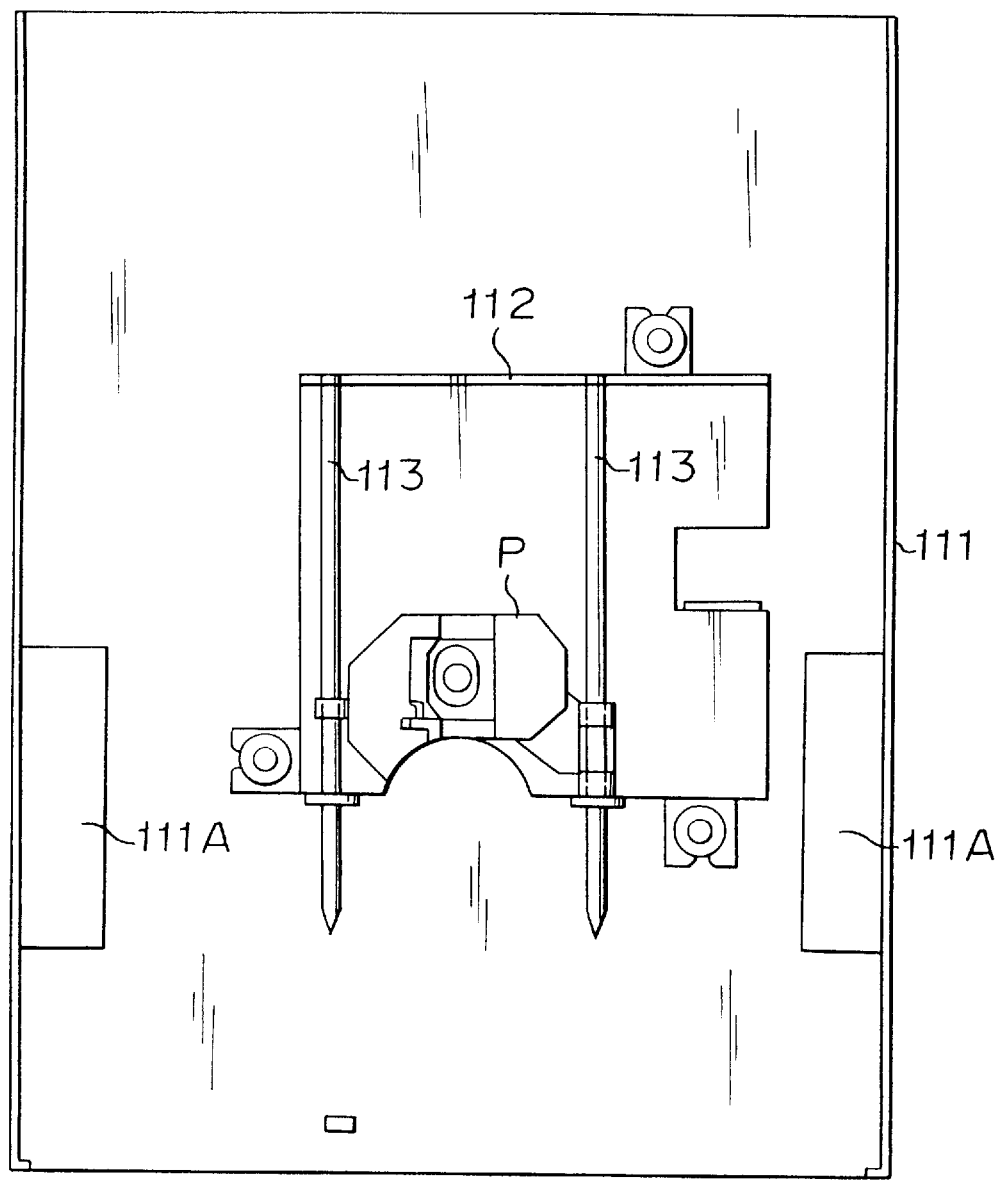
FIG. 24 is a plan view which shows a fixed chassis of the above fourth embodiment of this invention.

Then, the chassis assembly "85" which places the driving device of this invention is described with reference to FIG. 20 and FIG. 21.

In the Figures, 82 is a chassis of the chassis assembly 85, 98 is a pickup unit having a pickup 87 which is a guided driving member of this invention and 99 is a driving device for driving the pickup unit.

The driving device 99 is equipped with a rack 100a of one row and comprises a rack body 100 which performs a linear movement together with the pickup unit and a pinion 102 which drives the rack 100 by the rotation due to a driving force from the motor 101 by the engagement of the rack 100a. The rotation of the motor 101 is transmitted to the pinion 102 through an intermediate gear 104 meshed or engaged with a gear 103 and the pinion 102 at output side fixed to an output axis.

One side end of said pickup unit 98 is provided with a guide portion 98 which slides on the guide 105 integrally formed with chassis 82. Another side end of the pickup unit 98 is provided with guide shaft 107, said pickup unit 98 constructed to slide by being guided by guide 105 and guide shaft 107. At another side end of the pickup unit 98 is fixed a rack body 100 by a stopping screw 108. By this, the pickup unit 98 is adapted to perform a linear movement together with rack body 100.

Said rack body 100 is provided with a pair of spring portions 100b, 100b caused to urge the rack 100a to pinion 102. The spring portions 102b, 102b, are U-shaped which face each other in opposing directions.

In the driving device of this invention, since the rack 100a is always urged to the pinion 102 due to the energized force of the spring portions 100b, 100b, even if an engaging angle of the rack 100a against the pinion 102 changes due to an error at assembly or a combined error, a backlash occurring at the engagement portion of the rack 100a with pinion 102 is removed. Thus, linear movement of the pickup 87 can be carried out accurately and smoothly in a vertical direction in FIG. 20.

In the above embodiment, although the spring portion is U-shaped, other forms are also allowable as far as the same function is used.

Further, in the above embodiment, although the spring portion is provided to the rack body, a construction wherein the pinion is energized to the rack side may be used.

Since this embodiment is constructed as described above, the rack and pinion always maintain an appropriate engagement. Accordingly, the backlash which occurs at engagement portion is eliminated. Accordingly, the driving member can accurately and smoothly drive.

The lock construction of the tray 84 is next described with reference to FIGS. 12, 19 and 22.

FIG. 22 shows a material portion of the lock mechanism provided in tray 84.

The tray 84 is provided with a rotatable lock lever 110 latched with an eject button 109 at one side 110a thereof together with the eject button 109, a torsion spring which energizes the eject button 109 to the box body front together with energizing the lock lever 110 to the guide member 69 side, and at guide member 69, a latching hole 69 which latches with other side 110b of the lock lever 110. Further, 109a is a latching hole of the eject button 109 which latches with a projection of the lock lever 110, 109b is a hook provided at the eject button 109 which latches with one end portion 111a of the torsion spring 111, the other end portion 111b of said torsion spring 111 energizing the lock lever 110 to the guide member 69 side by latching at the latching portion of the lock lever 110.

In the lock construction of the tray of the disc thus constructed, when the tray 84 is stored into the box body 65, if the tray is pushed in, since the other end 110b of the lock lever 110 is energized to the guide member 69 side due to the torsion spring 111, the other end side 110b of the lock lever 110 latches with the latching hole 69 provided at the guide member 69, whereby the tray 84 is locked (FIG. 22(a)).

In order to unlock, since the lock lever 110 rotates in the direction of the arrow A when the eject button 109 is pushed, the latching of the lock lever 110 with latching hole 69b is separated whereby the lock of the lock lever is released (FIG. 22(b)).

At this time, since the tray 84 is energized at the rear of the tray 84 by spring 96, the tray 84 is emitted from the box body 65 when a hand is separated from the eject button 109.

Thus, when the tray 84 is stored into the box body 65, if the tray 84 is pushed in, another end 110b of the lock lever 110 latches with latch holes 69b provided at the guide member 69 by torsion spring 111 whereby the tray 84 is locked.

In order to release the lock state, since the lock lever 100 rotates if the eject button 109 is pushed, the lock of the lock lever is released.

Accordingly, when the tray is ejected, the stroke becomes smaller whereby the printed substrate in the box body is possible to make larger. In other words, the minimization of the device becomes possible.

The fourth embodiment of this invention will be described with reference to FIG. 23 to FIG. 28 as follows.

The disc device of this invention is fundamentally provided with a fixed chassis in the box body 111, said chassis being supported by a pair of pole-like guide rails 113, 113 extended to the front and the rear so that the optical pickup P may be moved in a radius direction of the disc D. Further, a motor 115 for disc driving and a turntable 116 driven by this motor 115 are provided to the tray 14 charged to the device box body 111. The tray 114 is adapted to be slidably guided by the guide rails 111A, 111A provided at the left and the right of said device box body.

Particularly, at the tray 114, are provided a supporting stand 117 which supports the motor 115 and the turntable 16, a slide plate 118 movable to the front and the rear directions, and a maintenance member 119 which maintains a supporting stand 117 from right and left together with releasing the maintenance thereof by the operation in the tray charging direction of the slide plate 118. Further, a positioning means 120 is provided at the pickup P side, and when said maintenance due to the maintenance member 119 is released by the advance of the slide plate 118, the disc is positioned against the optical pickup P by supporting the supporting stand 117 at the fixed chassis 112 side.

Further, the supporting stand 117 is provided with inserting portions at the right and left sides, and a plurality of attaching holes 115a of the motor 115 at the center thereof. Furthermore, each pair of inserting holes 125 for positioning the motor at a certain position are provided on the right and left sides at the supporting stand 117 side when the motor is regenerated or recorded.

The maintenance member 119 is constructed by a couple of members movable to the left and the right in respect to the tray 114 and the supporting stand 117, for instance, energizing the tray 114 in the central direction through elastic members 121, 121 of a pair of tension coil springs or the like. The maintenance member 119 is provided with inserted portions 121, 121 which insert into the insert portions 117A, 117A of the supporting stand 117 so as to maintain the supporting stand 117 (please see FIG. 25). In order to move the maintenance member 119 to the left and right, guide slits (long holes) 119B, 119B are formed at the maintenance member 119 and guide pins 122, 122 inserted into these guide slits 119B, 119B respectively are installed to the tray 114 whereby the maintenance member 119 is adapted to move in the left and right directions.

The slide plate 118 and the maintenance member 119 are linked to each other through the guide means 123 which causes the left and right operation of the maintenance member 119 according to the advance or retreat of the slide plate 118. In other words, the guide means 123 forms grooves 119C, 119C having guide surfaces 123A, 123A which incline by 45 degrees against the front and rear to the maintenance members 119, 119 and further form guide surfaces 123B, 123B incline by 45 degrees to the front and rear at the right and left end portions of the slide plate 118 corresponding to said guide surfaces 123A, 123A.

In order to move the slide plate 118 to the front and rear, guide slits (long hole) 118A, 118A are formed at slide plate 118 and guide pins 124, 124 inserted into said guide slits 118A, 118 are installed into the tray 114.

A tension coil spring 118B which elastically maintains the slide plate 118B is bridged between the slide plate 118 and tray 114. Further, an urged element 118C for handling operation is provided at the front end of the slide plate 118.

A positioning means 120 in this embodiment, the front ends of the guide rails 113, 113 which guide the optical pickup P in the radial direction of the disc D extend with respect to the supporting stand 117 to form the top end thereof to be an acute angle (conica). Further, at the supporting stand 117, insertion holes 125, 125 for positioning which receive the extension portions 113A, 113A of the guide rails 113, 113 are provided respectively.

At the tray 114, is provided the lock means 126 which releases the lock of the slide plate 118 with respect to the tray 114 when the tray 114 is provided at a fixed position of the fixed chassis. In this embodiment, the lock means 126 is constructed by a lever 126A rotatably supported by tray 114, a latching pin 126B provided at the top end of the lever 126A, an L-shaped lock groove 126C formed at slide plate 118 which slides a latching pin 126B slidably, a torsion spring member 126A (not shown) maintained elastically in counterclockwise direction with a center of a rotatably supported point, and a stopper 126E provided at device box body 111 for clockwise rotation of the lever 126a.

Since the lock means 126 is constructed as above, in a state where the tray 114 is installed within the device box body 111, the stopper abuts against the portion 126D whereby the latching pin 126B (please see FIG. 25) latched with latching portion of the lock groove 126C releases the latching thereof and the slide plate 118 is enabled to move along the guide portion of the lock groove 126C. At this time, when the urged element 118C is urged against the spring 118B, the slide plate 118 advances to the tray 114 thereby causing the state in FIG. 26.

Figure 25:
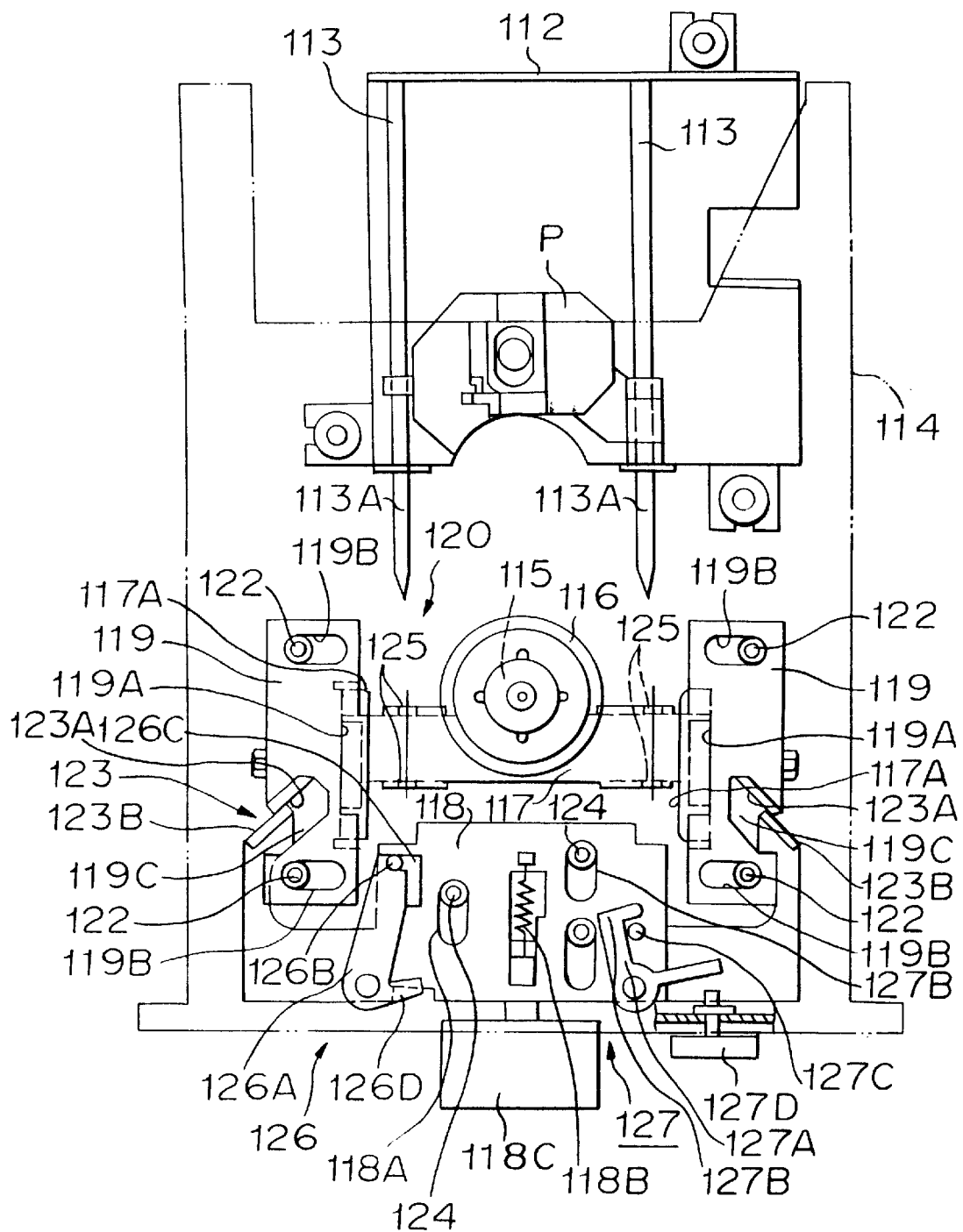
FIG. 25 is a plan view which shows a tray charging step state in the fourth embodiment of this invention.
Figure 26:
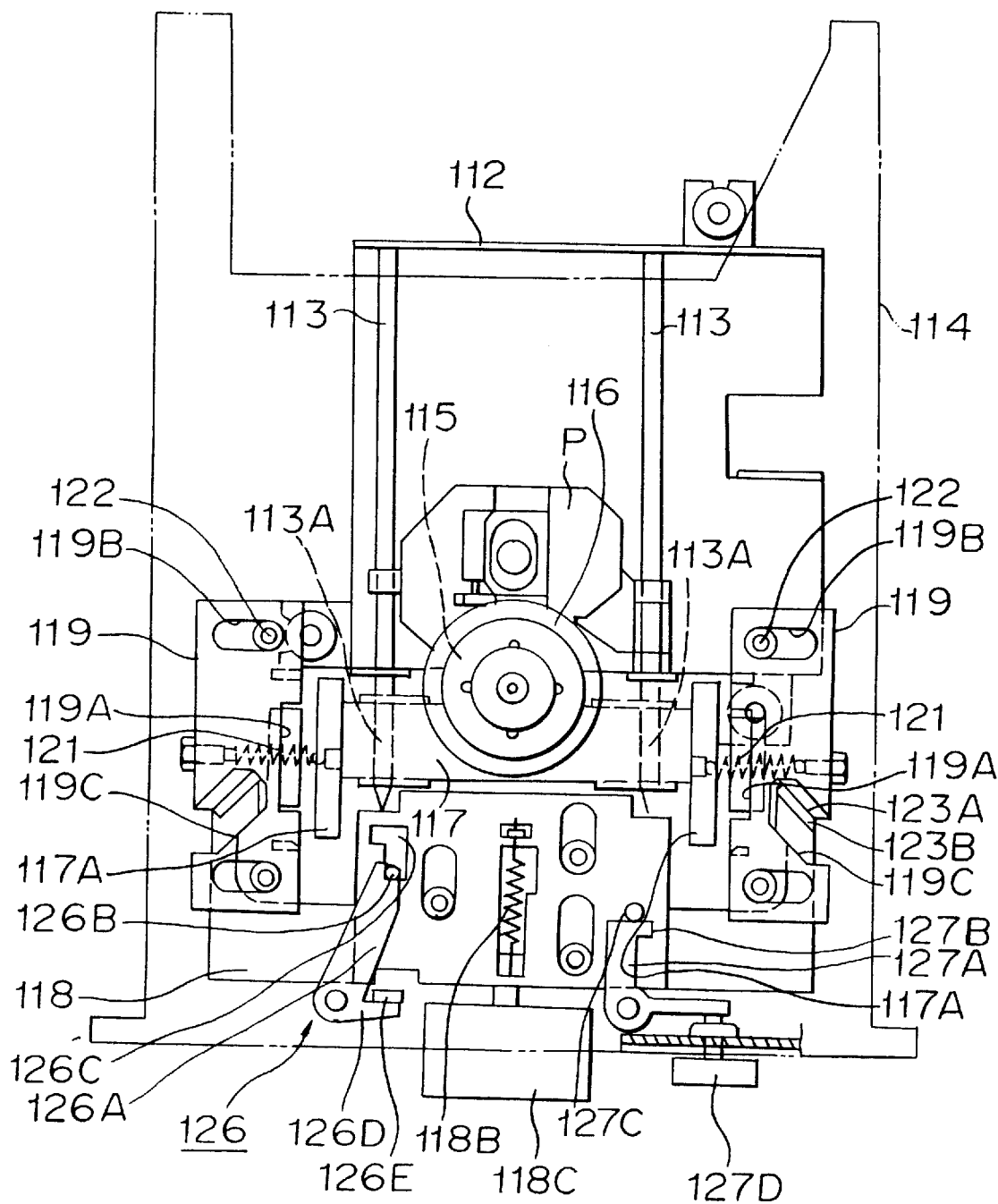
FIG. 26 is a plan view which shows a disc positioning state after tray charging in the fourth embodiment.

In other words, in a state where the tray 114 is not inserted as shown in FIG. 25, the guide surface 123B of the slide plate 118 does not urge the guide surface 123A. Accordingly, the maintenance members 119, 119 are urged in the central direction of the tray due to the elastic member 21. By this, the maintenance member 119 maintains the supporting stand 117. However, when the tray 114 is charged at a certain position, the extended portions 113A, 113A of the guide shafts 113, 113 are inserted into the positioned inserting holes 125, 125 of the supporting stand 117 respectively, whereby the motor 115 is positioned at a certain position. In this state, when the urged hole 118c is pushed to the rear of the box body 111, the guide surface 123A of the slide plate 118 urges the guide surface 123A of the maintenance member 119. Accordingly, the maintenance members 119, 119 move in an outside direction of the tray 114 against the energized force of the elastic member 21 whereby the maintenance member 119 releases the maintenance of the supporting stand 117. Further, a steel ball is combined with turntable and this steel ball is adapted to urge the turntable 116 by spring through the pressing plate.

Accordingly, when the disc is equipped to a convex portion formed at the central portion of the turntable 116 in no loading state of the tray 114 into the box body 111, said steel ball moves slightly in inner direction against said spring force. Then, when the disc is put fixedly on a certain position of the turntable 116, the steel ball moves outward whereby the steel ball is adapted to urge the disc to the turntable surface 116.

The tray 114 is provided a lock means 127 of the handling operation for locking the slide plate 118 in the loading position (please see FIG. 26) of the disc. This lock means in this embodiment is constructed by an L-type lever 127A rotatably supported by tray 114, a lock portion 127B formed at the top end of the lever 127A, a latching piston 127C provided at the slide plate 118 at the position corresponding to the lock portion 127B, a spring member (not shown) elastically maintaining the lever 127A in counterclockwise direction in FIG. 25 and FIG. 26, and an operational element 127D having a push button system which operates by pushing the lever 127a.

In this state wherein the slide plate 118 advances (FIG. 26) in accordance with tray 114 as described above, the latching pin 127C is supported by the lock member 127B whereby the return of the slide plate 118 due to the spring 118b can be prevented. Further, when the above lock is released by pushing the operation element 127D, the slide plate 118 retreats by the stored energy of the spring 118B. As a result, the latching pin 126B latches with the latching portion of the lock groove 126C again whereby the slide plate 118 locks again.

As described above, although the maintenance members 119, 119 maintain the supporting stand 117 while the tray 114 is inserted until a certain position, said maintenance is released at the step where the slide plate 118 advances with respect to the tray 114. Accordingly, the supporting stand 117 is supported by the extended portions 113A, 113A of the guide rails 113, 113 at the fixed chassis side 112 thereby being able to accurately determine a relative position with optical pickup P.

In this embodiment, since the attachment of the motor 114 to the supporting stand 117 requires a considerable accuracy, as shown in FIG. 28 especially, the relative position of the supporting stand 117 and the motor 115 is determined beforehand by using a jig (not shown) and an adhesive 128 such as a resinous agent or the like is filled during the intervals, and after being fixed, both may be connected by a means such as screwing.

The disc device of this embodiment has the following effects:

(1) This device consists of the fixed chassis provided with the optical pickup movably in a radial direction of the disc, the tray for loading a disc provided movably in the front and the rear direction of said fixed chassis together with putting the motor disc and the turntable fixedly thereon, the supporting stand which supports said motor for disc and the turntable provided at said tray, the slide plate movable to the front and the rear directions provided at the tray, and the maintenance member which releases the maintenance of said supporting stand by operation in the tray loading direction of said slide plate together with supporting said supporting stand. Accordingly, there is no need of providing a disc chucking to the box body. By this, the height of the box body can be smaller.

(2) Since the supporting stand is provided with an insertion portion on the left and right side thereof, and the maintenance members are constructed by a pair of members movable to the left and the right of the tray so as to maintain the supporting stand elastically from the right and left side through the elastic member and further the inserted portion inserted to said insertion portion thereby maintaining said supporting stand, the motor and the turntable can be moved to the outside of the box body with a simple construction.

(3) The front end portion of the guide rail which guides the optical pickup in a radial direction of the disc is extended according to the said supporting stand and further an insertion hole which determines a receiving position of the extension portion of said guide rail is provided at said supporting stand. Accordingly, the motor and the turntable are guided and positioned at a certain position easily and accurately.

The fifth embodiment of this invention will be described as follows with reference to FIGS. 29 to 36.

Figure 30:
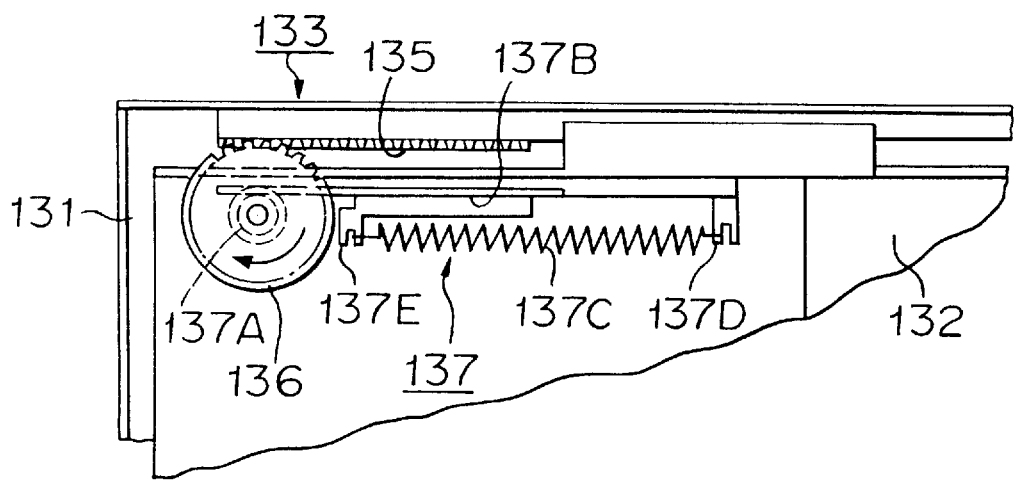
FIG. 30 is detailed descriptive views which show a charged state of the slide chassis of the fifth embodiment of this invention, (a) being a plan view, and (b) being a longitudinal sectional side view thereof.
Figure 30:
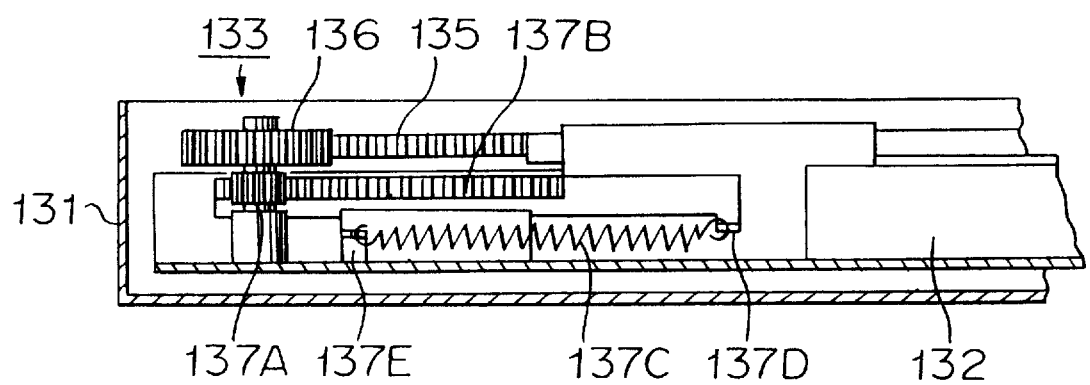

FIGS. 29 to FIG. 31 represent an embodiment of this invention.

The disc device shown in FIGS. 29 to FIG. 31 is constructed by a device box body 131 and a slide chassis (a supporting chassis for sliding the tray) 132 which puts in or out from front opening of said device box body 131, said slide chassis 132 being provided with an optical or a magneto-optical recording and/or generative means, a turntable loading a disc and a driving means thereof (not shown). This recording/generative means may be provided to the device box body side.

The eject mechanism 133 by which the slide chassis 132 in the device box body 131 is taken out from said box body is provided with a first rack provided at the inside of the device box body 131 along one of guide rails 134 provided at left and right of the device box body 131 which guides the slide chassis 132, a first gear 136 rotatably supported at one side of the rear portion of the slide chassis at a position where the first gear 136 engages with said first rack 135, and a spring mechanism 137 storing a return energy force by the engagement of the first rack 135 and the second gear 136 when the slide chassis 132 is led into the device box body 131.

The spring mechanism 137 consists of, as shown in FIGS. 30 and FIG. 31, a second gear 137A having a small diameter provided at the same axis with the first gear 136, a second rack 137B engaged with the second gear 137A which is provided at slide chassis 132 in a movable state in a transfer direction of the slide chassis 132, and a spring member 137C, e.g., a tension spring coil or the like which bridges between the second rack 137B and the slide chassis 132.

In the figures, the numerals 137d and 137E are hooks provided at second rack 137B and slide chassis 132, respectively, for latching and maintaining the end portions of the spring member 137C.

In such construction, when the slide chassis 132 is led into the device box body 131 (please see arrow A in FIG. 31), the first gear 136 starts to engage with first rack 136 during its insertion said slide chassis 132 and thereafter rotates on the first rack 135 while the slide chassis 132 moves (please see arrow B). By this, the second rack 137B which engages with second gear 137A at the rate of gear ratio of second gear 137A to first gear 136 retreats whereby the spring member 137c is pulled. Thus, in the spring mechanism 137 is stored the return energy force. After that, the slide chassis 132 is locked within the device box body 131 at the position where the information is recorded and regenerated (please see FIGS. 29(a), (b) and FIG. (3)). Further, the lock means is not shown.

When the lock is released and the slide chassis 132 is taken out from the device box body 131, the energized force of the spring member 137 is released and the second rack 137 advances to the slide chassis 132 whereby the first 136 and the second gear 137A reversely rotate and the slide chassis 132 is taken out to the outer side of the device box body 131 until the first gear 136 comes off from the first rack 135. In this case, a return amount of the slide chassis 132 to an extended amount of spring member 137 is determined by the gear ratio described above. Accordingly, the above return amount can be increased appropriately by selecting the ratio of number of teeth of the first gear 136 and the second gear 137A.

Figure 32A:
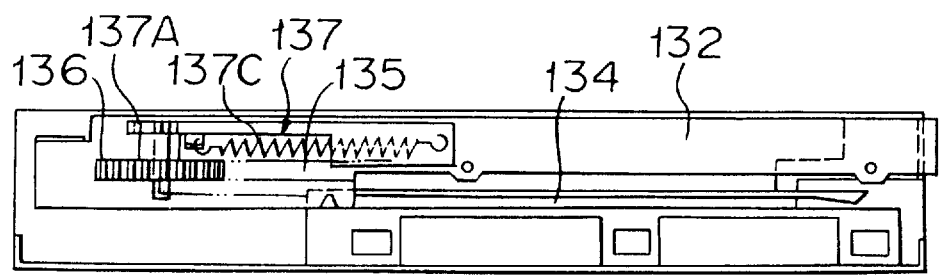
FIG. 32 is a modification view of the fifth embodiment of this invention, (a) is a side sectional view and (b) is a plan view thereof.
Figure 32B:
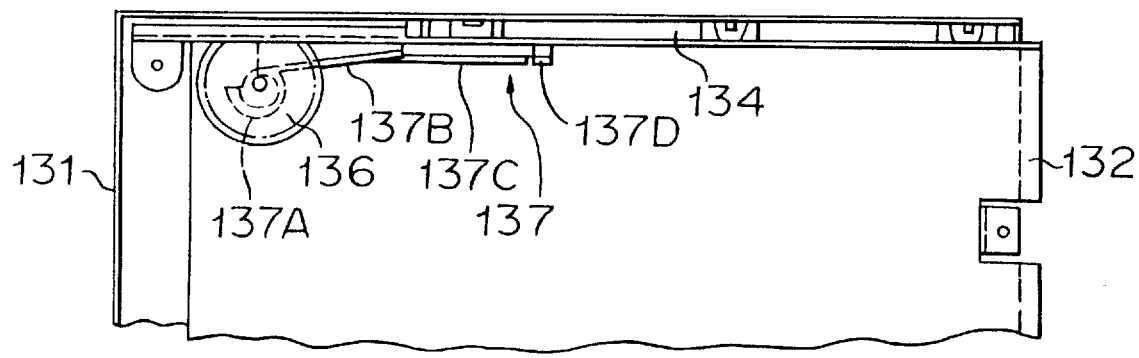
Figure 33:
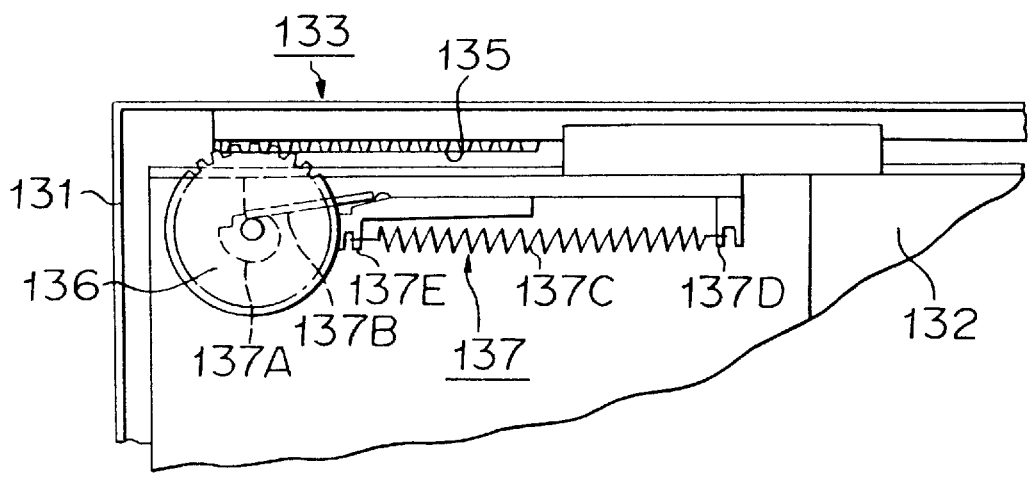
FIG. 33 is a detailed descriptive view which shows a slide chassis charging state shown in FIG. 32, (a) is a plan view and (b) is a longitudinal sectional side view.
Figure 33:
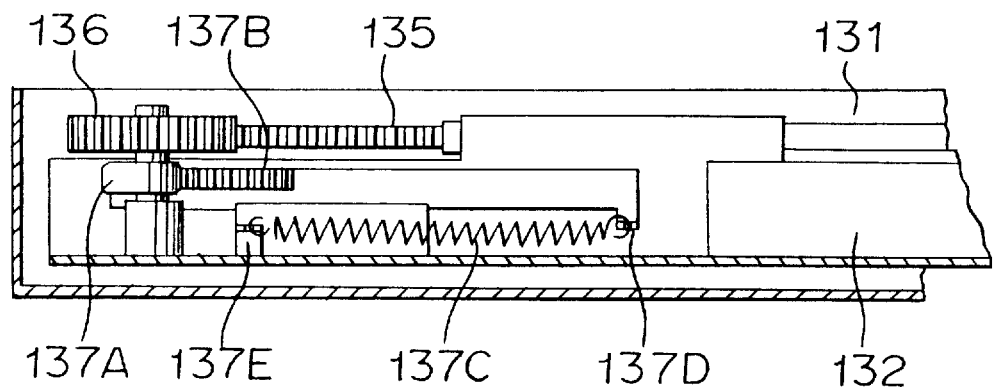
Figure 34:
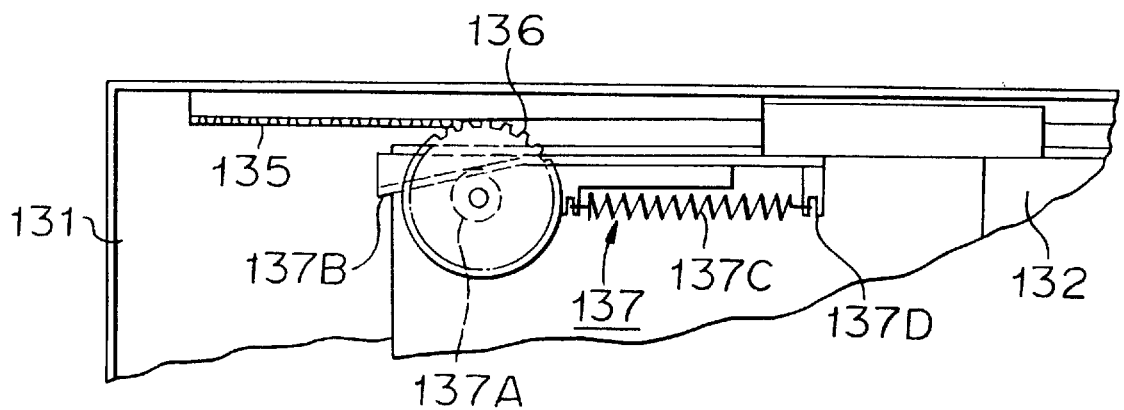
FIG. 34 is detailed descriptive views which show when the slide chassis of FIG. 33 is drawn out, (a) is a plan view and (b) is a longitudinal sectional side view.
Figure 34:
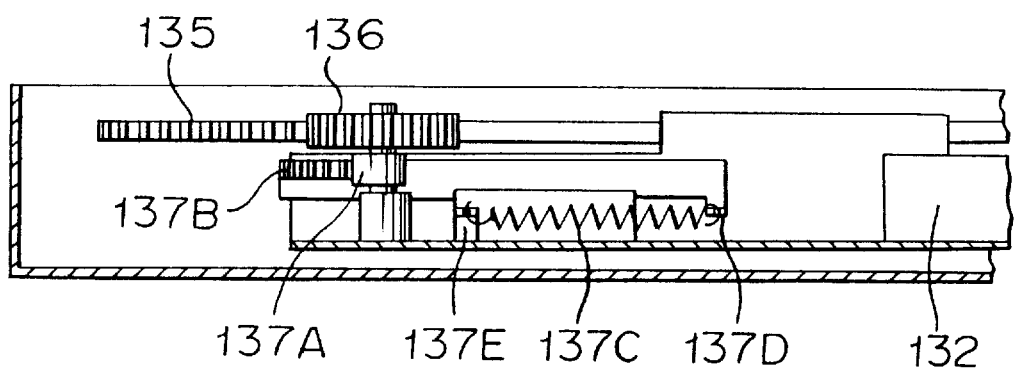

In the modification embodiment shown in FIG. 32 to FIG. 34, the second gear 173A is constructed by a different gear which gradually decreases radial size thereof in a circular direction so that an engagement radius with the second rack 137B may be decreased relative to the leading direction of the slide chassis.

For this purpose, the second rack 137B inclines the rack teeth to the right and the left corresponding to the direction of movement of the slide chassis 132 so as to maintain the engagement thereof with respect to the second gear 137a.

Accordingly, when the slide chassis 137 is led into the device box body 131, the tension amount of the spring member 132 with respect to the sending amount of the slide chassis 132 is gradually decreased. By this, the pushing force of the slide chassis 132 by handling operation can be kept constant (generally, the tension coil spring increases the resistance force according to the increase of the extension amount), thereby being able to improve the feeling of the operation.

Figure 36A:
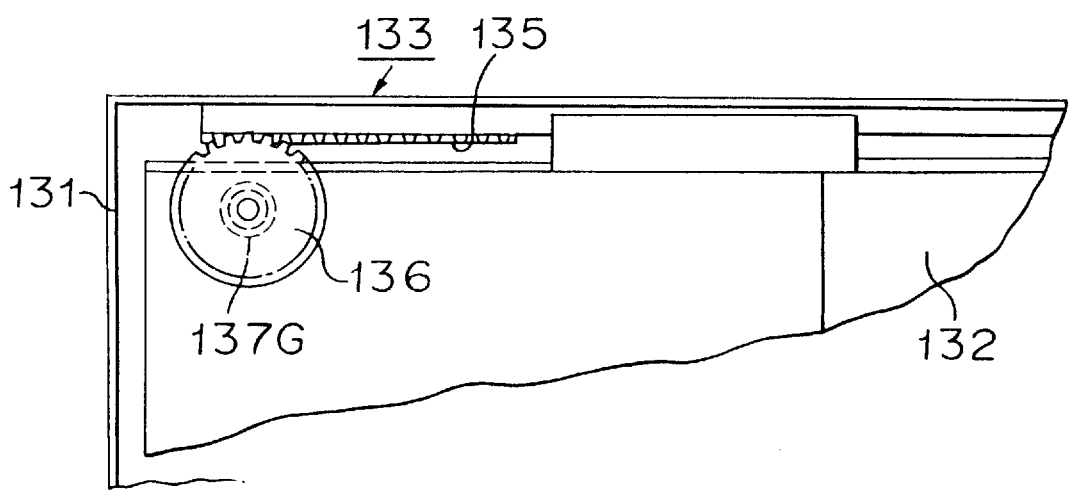
FIG. 36 detailed descriptive views which shows a charging state of the slide chassis shown in FIG. 35, (a) being a plan view and (b) being a longitudinal sectional side view.
Figure 36B:
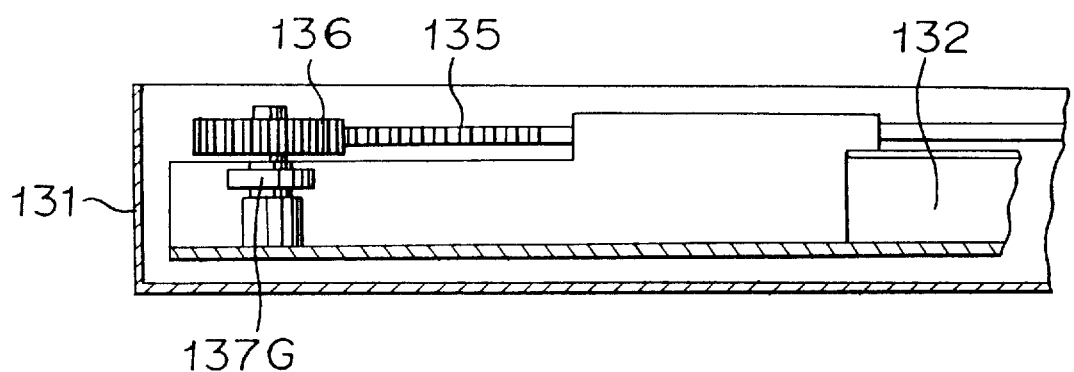
Figure 37A:
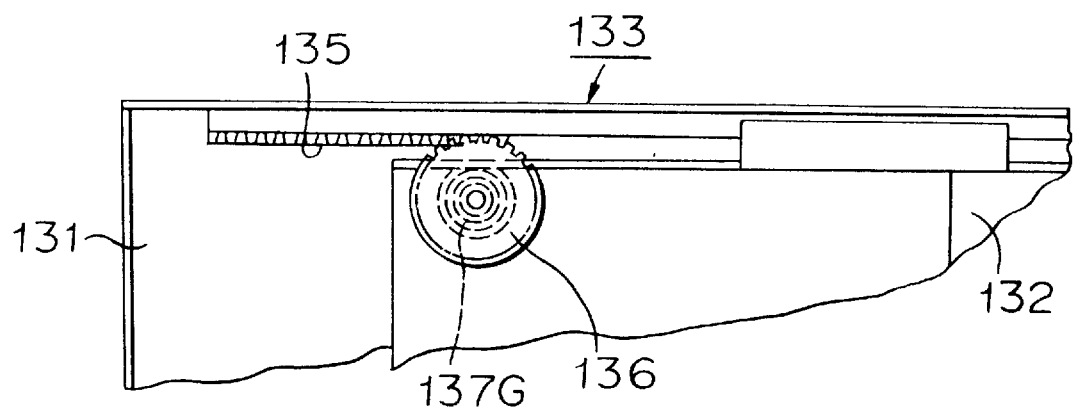
FIG. 37 is detailed descriptive views, (a) being a plan view and (b) being a longitudinal sectional side view.
Figure 37B:
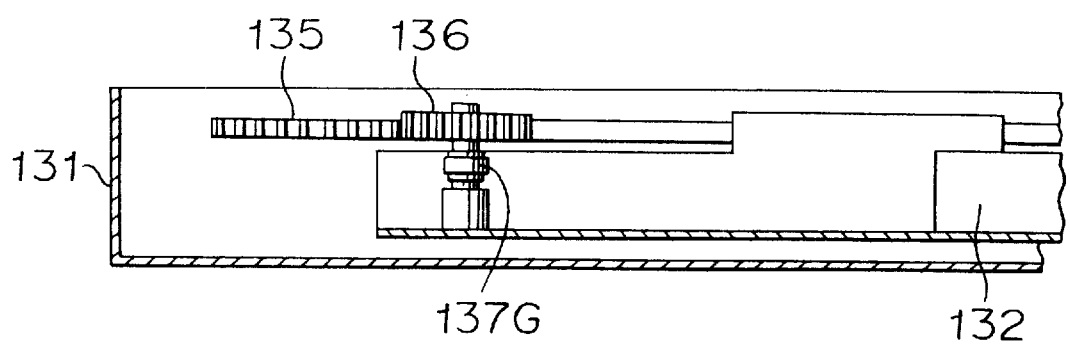

In the spring mechanism in another modification embodiment of this invention shown by FIG. 35 to FIG. 37, one end thereof is fixed to the slide chassis 132 and another end to the first gear 136 and constructed by a spiral spring member 137G wound clockwise.

When the slide chassis 132 is led in, the spiral spring 137G decreases the diameter according to the rotation of the first gear 136 thereby storing the return force thereof. The construction of the first gear 136 and the first rack 135 is the same as the embodiment shown in FIG. 29.

The feature of this construction is a simple one which adopts the spiral spring member 137G as a spring mechanism. Accordingly, this serves to decrease the number of parts, simplify the whole construction, and miniaturize the device greatly.

The eject mechanism of the disc device of this embodiment is, as described in detail, provided with a spring mechanism which stores the return force by the engagement of the first rack with first gear, and the stored spring force acts until the engagement of the first gear and the first rack is released at the time of ejection whereby a sufficient return amount can be secured when the slide chassis is taken out from the device box body.

The sixth embodiment will be described as follows with reference to FIG. 38 and FIG. 39.

Figure 39B:
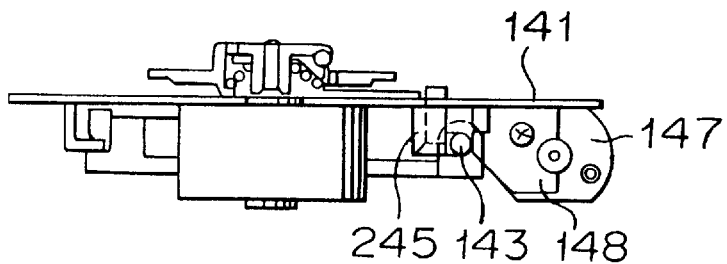
FIG. 39 is a descriptive view of the sixth embodiment of this invention, and (a) is a bottom view, (b) is a rear view and (c) is an elevational view thereof.
Figure 39A:
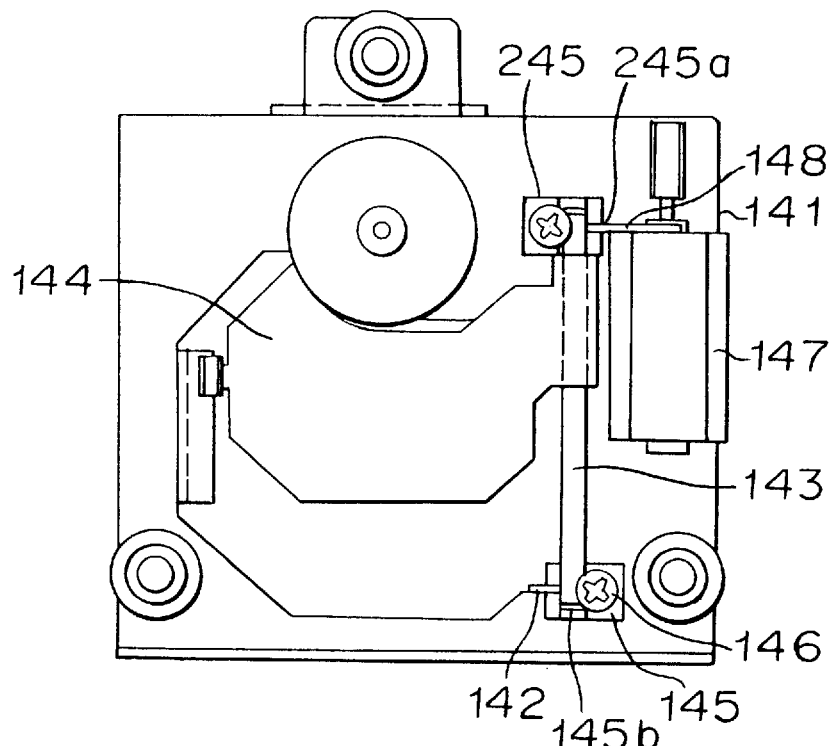
Figure 39C:
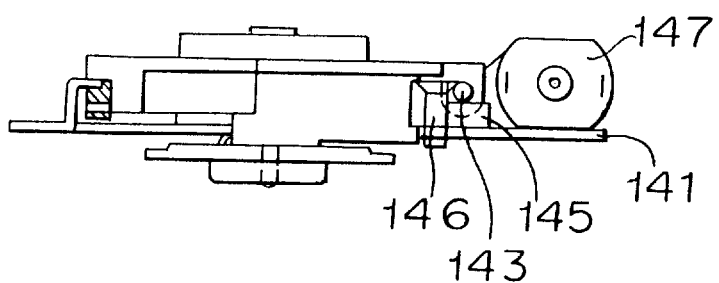

FIG. 38 and FIG. 39 are drawings which show the sixth embodiment of this invention. The numeral 141 is a chassis, chassis 141 being formed a cut raising up portion 142 for positioning.

The numeral 143 is a guide shaft which guides the pickup, said guide shaft 143 being supported by the receiving stand 145.

The receiving stand 145 is constructed by a slit 145a for positioning the insertion position of the cut raising 142 of the chassis 141, a stopper 145b for determining the position of the shaft direction of the guide shaft 143 and a screw hole 145C for stopping the screw with a dish-vis 146 at the hole 141 of the chassis 141.

Another end of the guide shaft 143 also fixes the guide shaft 143 by using the same receiving stand 245 as the receiving stand 145, a slit 245a of said receiving stand 245 being adapted to be inserted a cut-raising 148 for motor attachment for attaching a motor 147 for pickup driving. This cut-raising 148 for motor attachment is also formed at the chassis 141.

In the disc device thus constructed, since the receiving stand 145 is positioned by the cut-raising 142, guide shaft 143 and the screw hole 141a, the guide shaft 143 is also fixed at a certain positioned place.

In this embodiment, said cut-raising 148 is used for positioning for guide shaft 143 and the motor attaching, and is equipped with miniaturized operation of the device.

Figure 40:
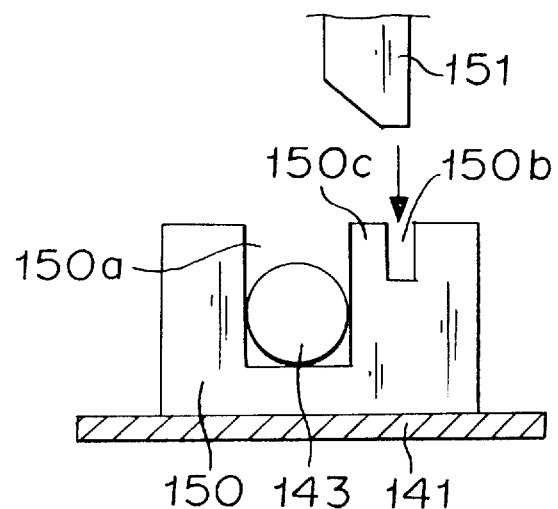
FIG. 40 is a modification view of the sixth embodiment of this invention.
Figure 40:
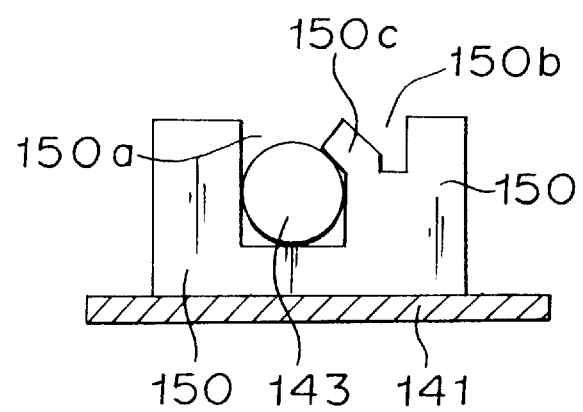

FIG. 40 is a sixth modification of the embodiment of this invention which fixes the gas shaft 143 by using the cut-raising 150 formed at chassis 141 without using the receiving stand dish At the cut-raising 150, together with a receiving portion 150 of the guide shaft 143 having a "⊐" shape is formed, a slit 150 for caulking is formed thereby fixing the guide shaft by caulking a part 150 between the receiving portion 100 having a "⊐" shape and the slit 150b with a caulking jig 151.

FIG. 41 is other modification of the sixth embodiment, said guide shaft 143 in this modification being an L-type cut-raising 152 formed at chassis 141, a cut-raising 154 formed a projection 153 for fixing a guide shaft 143 at the top end of the cut-raising and a cut-raising 155 for positioning of axial direction of the guide shaft 143.

In this modification, the guide shaft 143 is fixed on the chassis 141 by forcibly inserting the guide shaft from the upper portion of the cut-raising 152.

FIG. 42 is a further modification of the sixth embodiment of this invention.

The pickup 160 is movable in a direction shown by an arrow by being guided by guide shaft 143 and the cut-raising 161 of the chassis 141.

At one side of the pickup 160 is formed a bearing portion 161 due to two projections 160a, 160b, an interval between the projection 160a and 160b is A.

A bearing portion 163 slides along the cut-raising 161 of the chassis through resin member 162 made of elastic material, and the pickup 160 is movable. At the resin member 162 is formed a hole 162 in which the projection 160a of the pickup is inserted therethrough and a sliding contact portion 162b which slidably contacts with cut-raising 161. If the size of the lower surface 162C of the hole 162a and the sliding contact surface is taken as C, a thickness of the cut-raising 161 is taken as D, this size is designed so as to hold the following relation:

$C<A-D.$

Further, the upper portion of the resin member 162 may be cut as shown in FIG. 42.

What we claim is:

1. An improved disc device comprising a slidable chassis provided in a box body, and said box body being formed with an L-shape bending portion at an inner side of said body; a pair of oppositely disposed guide portions, each having a projection, and being formed at opposite sides of said chassis; a tray for disc conveyance attached to said chassis, guide members, each having a groove, and being formed at said opposite sides of said box body for guiding said guide portions of said chassis; each said projection being formed at an end of said groove and is arranged to contact said groove in each of said guide members; and a roller arranged on each of said guide members below a lower edge portion of said tray, so that said tray is in rolling contact with each said roller; and said L-shaped bending portion being formed at a rear end portion of one of said guide members, and further comprising a torsion spring attached to said tray to abut said torsion spring against said L-shaped bending portion to facilitate election of said tray, whereby as compared to like-conventional disc devices, said improved disc device is simpler in construction, requires less parts and is more economical to fabricate.

2. A disc device according to claim 1, further including a cover plate formed with a tongue piece at a front end of said cover plate, and said guide members being formed with a latching portion for latching said tongue piece.

3. A disc device according to claim 2, wherein said cover plate is formed with a receiving portion on said guide members proximate to said cover plate, said receiving portion being arranged to abut against said cover plate.

4. A disc device according to claim 2, wherein said guide members are provided at a rear end thereof with a slit, said box being provided with a cutaway; and further comprising a printed writing plate supported by said cutaway and said slit.

5. A disc device according to claim 2, further comprising a stopper provided at said front end of said cover plate, and said tray being provided with a rib arranged to abut against said cover plate.

6. A disc device according to claim 5, wherein said stopper is L-shaped.

7. A disc device according to claim 1, further including a cover plate formed with a receiving portion on said guide members proximate to said cover plate, said receiving portion being arranged to abut against said cover plate.

8. A disc device according to claim 7, wherein said guide members are provided at a rear end thereof with a slit, said box body being provided with a cutaway; and further comprising a printed writing plate supported by said cutaway and said slit.

9. A disc device according to claim 7, further comprising a stopper provided at a front end of said cover plate, and said tray provided with a rib arranged to abut against said cover plate.

10. A disc device according to claim 9, wherein said stopper is L-shaped.

11. A disc device according to claim 2, further comprising a stopper provided at a front end of said cover plate, said tray being provided with a rib arranged to abut against said cover plate.

12. A disc device according to claim 11, wherein said guide members are provided at a rear end thereof with a slit, said box body being provided with a cutaway; and further comprising a printed writing plate supported by said cutaway and said slit.

13. A disc device according to claim 11, wherein said stopper is L-shaped.

14. A disc device according to claim 11, wherein said guide members are provided at a rear end thereof with a slit, said box body being provided with a cutaway; and further comprising a printed writing plate supported by said cutaway and said slit.

* * * * *